United States Patent
Kagawa et al.

(10) Patent No.: US 7,146,038 B2
(45) Date of Patent: Dec. 5, 2006

(54) COLOR CONVERSION APPARATUS, AND COLOR CONVERSION METHOD

(75) Inventors: Shuichi Kagawa, Tokyo (JP); Hiroaki Sugiura, Tokyo (JP); Mariko Takahashi, Tokyo (JP); Narihiro Matoba, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 617 days.

(21) Appl. No.: 10/212,108

(22) Filed: Aug. 6, 2002

(65) Prior Publication Data

US 2003/0165266 A1   Sep. 4, 2003

(30) Foreign Application Priority Data

Feb. 15, 2002   (JP) ............................. 2002-037642

(51) Int. Cl.
  G06K 9/00   (2006.01)
  G03F 3/08   (2006.01)
  G06F 13/00   (2006.01)
(52) U.S. Cl. ...................................... 382/166; 358/523
(58) Field of Classification Search ................ 382/162, 382/165, 166, 167; 358/1.9, 515, 518, 520, 358/523, 521; 345/589, 600, 603, 604
See application file for complete search history.

(56) References Cited

U.S. PATENT DOCUMENTS

| 4,740,833 | A | 4/1988 | Shiota et al. |
| 4,887,150 | A | 12/1989 | Chiba et al. |
| 4,989,079 | A | 1/1991 | Ito |
| 5,436,733 | A | 7/1995 | Terada et al. |
| 5,659,406 | A | 8/1997 | Imao et al. |
| 5,933,252 | A | 8/1999 | Emori et al. |
| 5,937,089 | A * | 8/1999 | Kobayashi ................... 382/167 |
| 6,125,202 | A | 9/2000 | Kagawa et al. |
| 6,297,826 | B1 * | 10/2001 | Semba et al. ............... 345/589 |
| 6,434,268 | B1 | 8/2002 | Asamura et al. |
| 6,771,813 | B1 * | 8/2004 | Katsuyama ................. 382/165 |
| 6,781,716 | B1 * | 8/2004 | Yoda .......................... 358/1.9 |
| 6,829,062 | B1 * | 12/2004 | Asamura et al. ............ 358/1.9 |
| 6,865,292 | B1 * | 3/2005 | Kagawa et al. ............. 382/167 |
| 2003/0165266 | A1 * | 9/2003 | Kagawa et al. ............. 382/166 |
| 2003/0228055 | A1 * | 12/2003 | Kanagawa et al. ......... 382/162 |

FOREIGN PATENT DOCUMENTS

| EP | 1028586 A | 8/2000 |
| JP | 63-39188 B2 | 8/1988 |
| JP | 63-227181 | 9/1988 |
| JP | 2-30226 | 7/1990 |
| JP | 5-48885 | 2/1993 |
| JP | 5-183742 | 7/1993 |
| JP | 7-023245 | 1/1995 |
| JP | 7-170404 | 4/1995 |
| JP | 8-321964 | 12/1996 |
| JP | 11-17974 | 1/1999 |
| JP | 11234531 | 8/1999 |
| JP | 2001-307080 A | 11/2001 |

* cited by examiner

*Primary Examiner*—Amir Alavi
(74) *Attorney, Agent, or Firm*—Birch, Stewart, Kolasch & Birch, LLP

(57) ABSTRACT

A method and apparatus for converting color includes converting the hue, lightness, and/or saturation of first color data representing each of plurality of colors forming a color image, to produce second color data corresponding to the first color data. The second color data is converted to third color data suitable for the color space which can be expressed by the image output device used for the output of the color image. Color contraction which is conventionally associated with color conversion that increases lightness or saturation can be prevented.

15 Claims, 30 Drawing Sheets

COLOR DATA MULTIPLICATION COEFFICIENT CALCULATOR 4a

MAXIMUM OF R2,G2,B2
(READ ADDRESS)

FIG.21
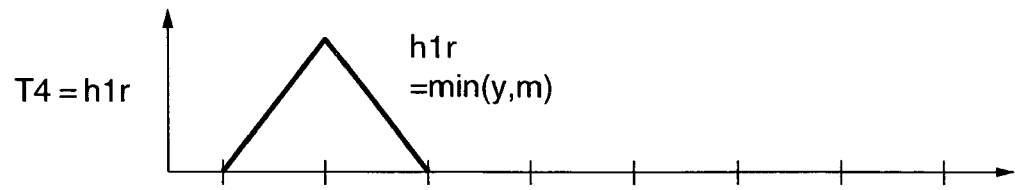
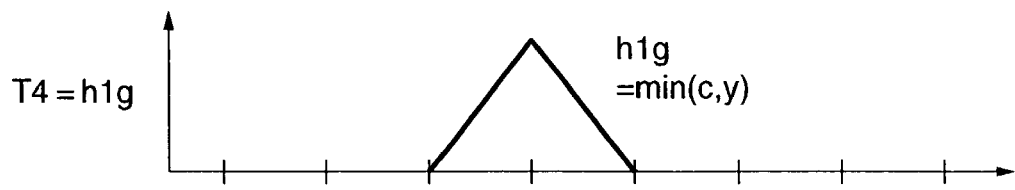
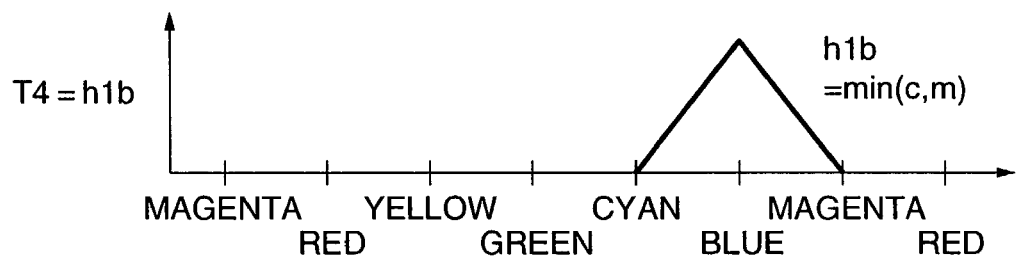
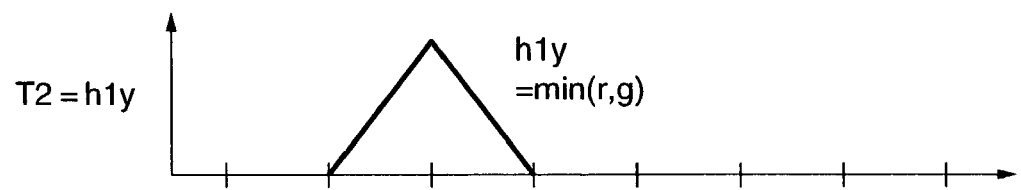
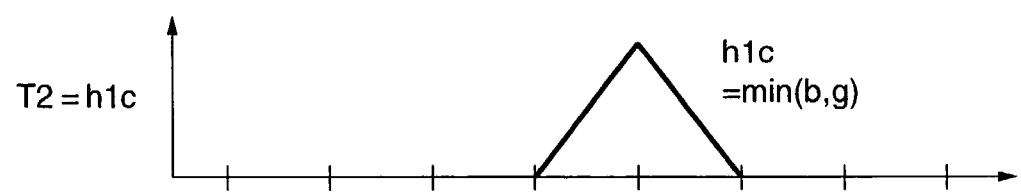
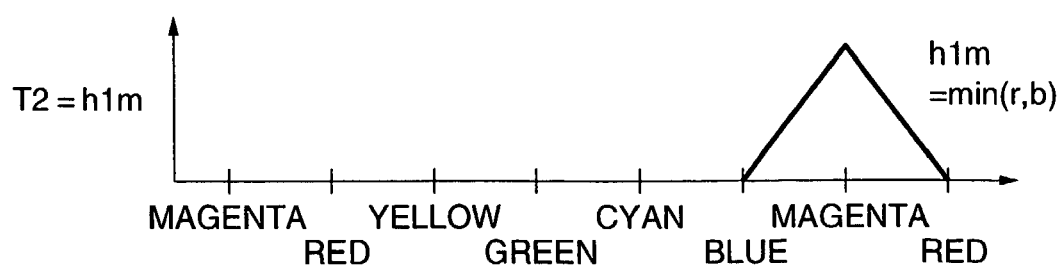

COLOR CONVERSION APPARATUS, AND COLOR CONVERSION METHOD

BACKGROUND OF THE INVENTION

1. Field of the Invention

The present invention relates to a color conversion apparatus in an image output device, such as an image display device, color printer, or color scanner, and in particular, to a color conversion apparatus, and a color conversion method converting color data representing images, in accordance with the characteristics of the output device reproducing or expressing the image.

2. Prior Art

When input color data is displayed by an image display device, color conversion is performed to achieve desired color rendition or reproducibility in accordance with the conditions in which the device is used. Also in printers, color conversion is performed to achieve good color reproducibility for compensating for mixed-color property due to the fact that inks are not of pure colors, and picture quality degradation due to non-linearity of the input-output characteristics.

Two typical color conversion methods are of a table conversion method and a matrix calculation method. The table conversion method uses a memory such as a ROM for storing conversion coefficients corresponding to the input color data representing each of the colors of R, G, B, and performs color conversion in accordance with the stored conversion coefficients. An advantage of this method is that color conversion can be performed based on an arbitrary conversion characteristics.

However, it is necessary to store conversion coefficients for respective combinations of the color data, and a memory of a large capacity is required, so that implementation in an integrated circuit is difficult. Another problem is that it cannot be adapted to changes in the condition in which the device is used.

The matrix calculation method performs a matrix calculation in accordance with the following formula (24) using the color data Ri, Gi, Bi representing colors of R, G, B, to output new color data Ro, Go, Bo.

$$\begin{bmatrix} Ro \\ Go \\ Bo \end{bmatrix} = (Aij) \begin{bmatrix} Ri \\ Gi \\ Bi \end{bmatrix} \quad (24)$$

In the above formula, Aij (i=1 to 3, j=1 to 3) are matrix coefficients determining the conversion coefficients for the color conversion.

There is a concept of "preferred color reproduction" as opposed to the concept of "exact color reproduction." "Exact color reproduction" means exact or faithful reproduction of colors of the original, and color conversion which matches the method of generating the input color data is performed. For example, the color reproduction using standard color space, such as that of NTSC, or sRGB is performed. "Preferred color reproduction" does not necessarily coincide with "exact color reproduction," and is a color reproduction taking into consideration the characteristics of human visual sense, and memorized colors, and produces colors preferred by human beings.

Often, "preferred color reproduction" is performed in connection with moving pictures of television images. For instance, there is a tendency that the color of the sky, or green of the lawn is often memorized as colors which are more vivid, and of a higher saturation. Accordingly, in "preferred color reproduction," a general practice is to perform the color conversion in which the saturation or lightness (value) of the colors are increased. In "exact color reproduction" as well, it is not rare that color conversion which increases the saturation or lightness is performed. This is because, the range or gamut of the colors which can be expressed by the image display device is narrower than the gamut of the standard color space or the color space used in the generation of the image data.

FIG. 36 shows a configuration of a conventional color conversion apparatus. A color converter 1 performs color conversion on first color data R1 G1, B1 to generate second color data R2, G2, B2. A data limiter 101 limits the second color data R2, G2, B2, to output third color data which can be displayed by the image display device, not shown, provided in a succeeding stage.

In the conventional color conversion apparatus shown in FIG. 36, due to the function of the data limiter 101, the color contraction (a phenomenon in which a fine difference between colors of high lightness or saturation is eliminated (two different input color data are translated into the same color) may occur. A specific example of color contraction due to the limiting operation will next be described.

It is presumed that the first color data R1, G1, B1 is 8-bit digital data representing an integer without a sign, assuming a value of 0 to 255, and the second color data R2, G2, B2 is 10-bit digital data with a sign, assuming a value of −512 to 511. It is also presumed that the number of gradation levels which can be displayed by the image display device used for displaying the image responsive to the second color data R2, G2, B2 is 256 (expressed by 8 bits), and the data limiter 101 accordingly converts the second color data into the third color data of 8 bits.

The color converter 1 outputs the second color data by matrix calculation represented by the following formula (25).

$$\begin{bmatrix} R2 \\ G2 \\ B2 \end{bmatrix} = \begin{bmatrix} 1.2 & 0 & 0 \\ 0 & 1.2 & 0 \\ 0 & 0 & 1.2 \end{bmatrix} \begin{bmatrix} R1 \\ G1 \\ B1 \end{bmatrix} \quad (25)$$

The matrix calculation formula (25) is for increasing the lightness of the first color data R1, G1, B1.

For two different sets of first color data with: R1=230, G1=20, B1=20; and R1=240, G1=20, B1=20, the second color data obtained as a result of the color conversion according to the formula (25) will have values: R2=276, G2=24, B2=24; and R2=288, G2=24, B3=24. The third color data output from the data limiter 101, which limits the maximum value to "255," and input the limited data to the image display device, not shown, will have values: R3=255, G3=24, B3=24; and R3=255, G3=24, B3=24. Thus the two sets of different values representing different colors are translated into the color data of identical values, due to the limiting operation. In this way, the input or original color data representing colors of different hue, lightness or saturation (in the input or original data) are translated into and displayed as an identical color, and the difference between colors (as existed in the original image) is eliminated or diminished—this phenomenon is called color contraction.

The color contraction also occurs when a processing for enhancing the saturation is performed in the color converter 1. The following matrix calculation formula (26) is an example used to enhance the saturation of the first color data.

$$\begin{bmatrix} R2 \\ G2 \\ B2 \end{bmatrix} = \begin{bmatrix} 1 & -0.1 & -0.1 \\ -0.1 & 1 & -0.1 \\ -0.1 & -0.1 & 1 \end{bmatrix} \begin{bmatrix} R1 \\ G1 \\ B1 \end{bmatrix} \quad (26)$$

When color conversion using the matrix calculation formula (26) is applied to two sets of different values of color data: R1=230, G1=10, B1=10; and R1=232, G1=20, B1=20, the second color data will have values: R2=228, G2=−14, B2=−14; and R2=228, G2=−5, B3=−5. The data limiter 101 limits the minimum value of the second color data to "0" in accordance with the display characteristics of the image display device. The third color data supplied from the limiter 101 to the image display device (not shown) in a succeeding stage will have values: R3=228, G3=0, B3=0; and R3=228, G3=0, B3=0. Thus, the two sets of color data of different values are output as the color data of identical values.

As has been described, a conventional color conversion apparatus, which performs processing for enhancing lightness and/or saturation of the color data, is associated with a problem of color contraction in which fine differences between colors of high lightness or saturation diminishes.

SUMMARY OF THE INVENTION

The invention has been achieved in view of the above problem, and its object is to provide a color conversion apparatus and a color conversion method which can perform desired color conversion without color contraction.

According to the present invention, there is provided a color conversion apparatus including a second-color-data generating unit and a third-color-data generating unit. The a second-color-data generating unit converts a hue, lightness, and/or saturation of first color data representing respective colors forming a color image to generate second color data corresponding to the first color data. The third-color-data generating unit generates third color data suitable for the color space which can be expressed by an image output unit used for outputting the color image.

With the above arrangement, the third color data suitable for the color space which can be expressed by the image output unit is generated based on the second color data, so that desired color conversion can be achieved without color contraction.

The third-color-data generating unit may be adapted to generate the third color data based on a maximum value of the gradation levels of the respective colors represented by the second color data. In this case, the third color data generating unit may be adapted to reduce the gradation level of each of the colors of the second color data according to the maximum value in excess of a predetermined value.

The color conversion apparatus may further include a complementary-color-data outputting unit for outputting complementary color data representing the respective complementary colors of a plurality of colors represented by the second color data, and the third-color-data generating unit may be adapted to generate the third color data based on the complementary color data.

In this case, the third-color-data generating unit may be adapted to generate the third color data based on a maximum value of the gradation levels of the respective complementary colors represented by the complementary color data. In this case, the third-color-data generating unit may be adapted to generate the third color data by reducing the gradation level of each of the complementary colors of the complementary color data according to the maximum value in excess of a predetermined value.

The color conversion apparatus may further include a ratio calculating unit for calculating a ratio between the hue components of magenta and red, red and yellow, yellow and green, green and cyan, cyan and blue, or blue and magenta, and the third-color-data generating unit may be adapted to generate the third color data based on the ratio between the hue components.

According to the invention, there is also provided a color conversion apparatus including a first-calculation-term generating unit, a second-color-data generating unit, and a third-color-data generating unit. The first-calculation-term generating unit is responsive to first color data representing respective colors of red, green and blue, for generating a first calculation term which is effective for at least one of the hues of red, green, blue, cyan, magenta and yellow. The second-color-data generating unit generates second color data corresponding to the first color data. The third-color-data generating unit is responsive to the first calculation term, and the second color data, for generating third color data suitable for the color space expressed by the image output unit used for outputting the color image.

With the above arrangement, the second color data is generated based on the calculation term effective for one of the hues of red, green, blue, cyan, magenta, and yellow, and the third color data suitable for the color space which can be expressed by the image output unit is generated based on the calculation term and the second color data, so that it is possible to control each hue component independently, and to achieve desired color conversion without color contraction.

The third-color-data generating unit may be adapted to generate the third color data based on a maximum value of the gradation levels of the respective colors represented by the second color data. In this case, the third color data generating unit may be adapted to reduce the gradation level of each of the colors of the second color data according to the maximum value in excess of a predetermined value.

The color conversion apparatus may further include a second-calculation-term generating unit for generating a second calculation term effective for a predetermined hue included in one of inter-hue zones of red to yellow, yellow to green, green to cyan, cyan to blue, blue to magenta, and magenta to red, based on the first calculation term. In this case, the second-color-data generating unit may be adapted to generate the second color data also by multiplying the second calculation term by a predetermined matrix coefficient, and the third-color-data generating unit may be adapted to generate the third color data based also on the second color data.

With the above arrangement, it is possible, in color conversion, to independently control a certain hue component included in one of the inter-hue zones, and desired color conversion can be achieved without color contraction.

The invention also provides a color conversion method in which a hue, lightness, and/or saturation of first color data representing the respective colors forming a color image is converted to generate second color data corresponding to the first color data, and third color data suitable for the color space which can be expressed by an image output unit used for outputting the color image is generated based on the second color data.

With the above arrangement, the third color data suitable for the color space which can be expressed by the image output unit is generated based on the second color data, so that desired color conversion can be achieved without color contraction.

The third color data may be generated based on a maximum value of the gradation levels of the respective colors represented by the second color data. In this case, the third color data may be generated by reducing the gradation level of each of the colors of the second color data according to the maximum value in excess of a predetermined value.

The third color data may alternatively be generated based on the complementary color data representing the respective complementary colors of a plurality of colors represented by the second color data. In this case, the third color data may be generated based on a maximum value of the gradation levels of the respective complementary colors represented by the complementary color data. In this case, the third color data may be generated by reducing the gradation level of each of the complementary colors of the complementary color data according to the maximum value in excess of a predetermined value.

In the above method of color conversion, a ratio between the hue components of magenta and red, red and yellow, yellow and green, green and cyan, cyan and blue, or blue and magenta may be additionally calculated, and the third color data may be generated based on the ratio between the hue components.

BRIEF DESCRIPTION OF THE DRAWINGS

FIG. 21 schematically illustrates the relationship between the polynomial data and the hues;

DETAILED DESCRIPTION OF THE PREFERRED EMBODIMENTS

Embodiments of the invention will now be described with reference to the attached drawings.

Embodiment 1.

Figure 1:
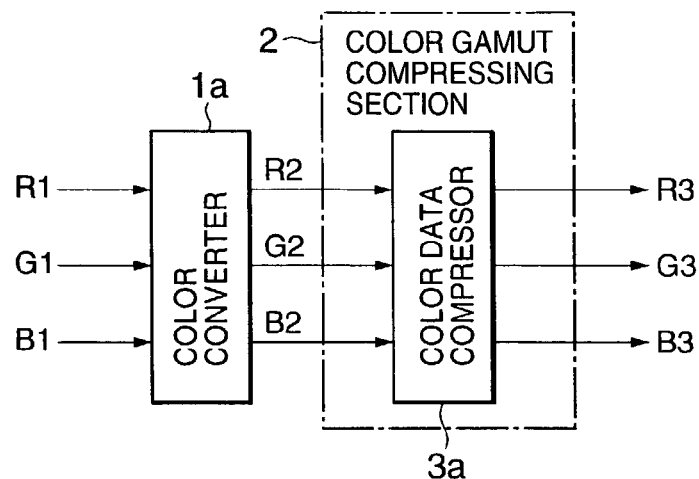
FIG. 1 is a block diagram showing the configuration of the color conversion apparatus according to Embodiment 1.

FIG. 1 is a block diagram showing the configuration of a color conversion apparatus according to Embodiment 1. As illustrated, the color conversion apparatus of this embodiment includes a color converter 1a, and a color gamut compressing section 2 consisting of a color data compressor 3a. The color converter 1a color-converts first color data R1, G1, B1 in accordance with the following matrix calculation formula (1) to output second color data R2, G2, B2. Here, Aij (i=1 to 3, j=1 to 3) are matrix coefficients determining the color conversion characteristics.

$$\begin{bmatrix} R2 \\ G2 \\ B2 \end{bmatrix} = (Aij) \begin{bmatrix} R1 \\ G1 \\ B1 \end{bmatrix} \quad (1)$$

The color data compressor 3a applies color gamut compression processing, to be described later, to the second color data R2, G2, B2, to output third color data R3, G3, B3. The third color data R3, G3, B3 is supplied to an image display device (not shown) provided in a subsequent stage.

The first color data R1, G1, B1 is color data of 8 bits (256 gradation levels) and can assume any value from 0 to 255.

Here, the second color data obtained by color-converting the first color data is assumed to be color data of 10 bits with a sign. The second color data can assume a value in the range of from −512 to 511. Accordingly, the second color data represents a gradation level of each of the colors of R, G, B, by means a value in the range of −512 to 511. The color data compressor 3a applies color gamut compression processing to the second color data R2, G2, B2, to produce color data having gradation levels suitable for the color space which can be displayed by the image display device. In the color conversion apparatus according to the present embodiment, the display ability of the image display device is of 8 bits, and accordingly, the color gamut compressing section 2 converts the second color data to the third color data R3, G3, B3 which is color data of 8 bits (256 gradation levels).

The second color data, and the third color data are generated taking into consideration the chromaticities of the primary colors of the image display device used, and the chromaticities of the primary colors of the color spaces expressed by the second and third color data are made equal. When the chromaticities of the primary colors are equal, the magnitude of the color space that is expressed depend on the values of the color data. The color data compressor 3a converts the second color data to the third color data which represents hues equal to the those of the second color data and which can be expressed by the image display device.

The main function of the color data compressor 3a is to perform color gamut compression processing for avoiding color contraction due to color conversion that increases the lightness.

Figure 2:
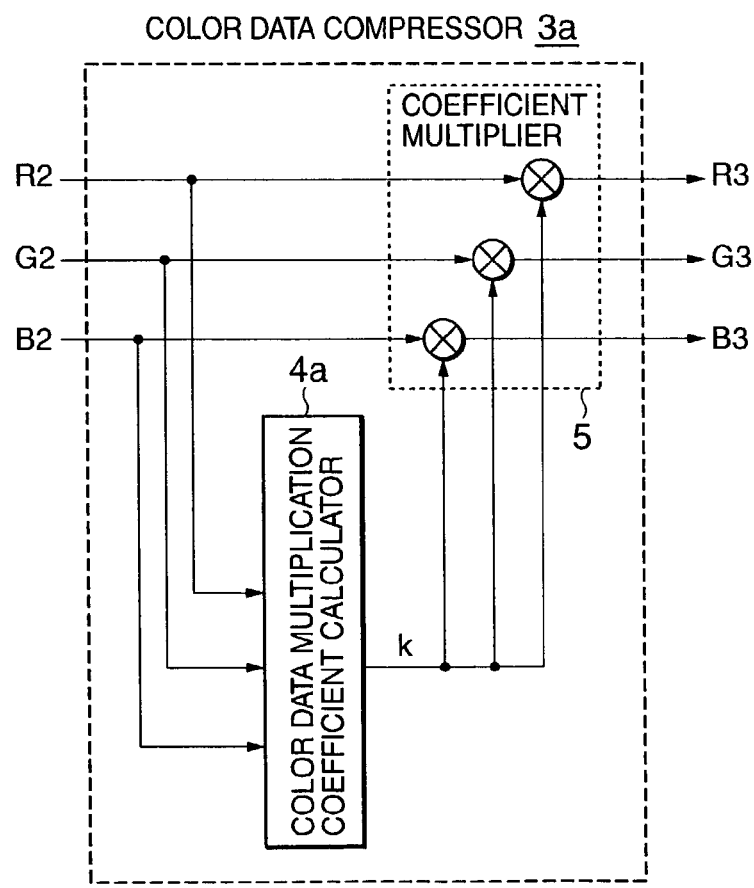
FIG. 2 is a block diagram showing the configuration of the color data compressor.

FIG. 2 is a block diagram showing the configuration of the color data compressor 3a. As shown in FIG. 2, the color data compressor 3a comprises a color data multiplication coefficient calculator 4a, and a coefficient multiplier 5. Based on the maximum value of the second color data R2, G2, B2 output from the color converter 1a, the color data multiplication coefficient calculator 4a outputs a color data multiplication coefficient k, and supplies it to the coefficient multiplier 5. The coefficient multiplier 5 multiplies the second color data R2, G2, B2 by the color data multiplication coefficient k to produce the third color data R3, G3, B3. The third color data R3, G3, B3 output from the coefficient multiplier 5 can be represented by the following formula (2):

$$R3 = k \times R2$$
$$G3 = k \times G2$$
$$B3 = k \times B2 \quad (2)$$

Figure 3:
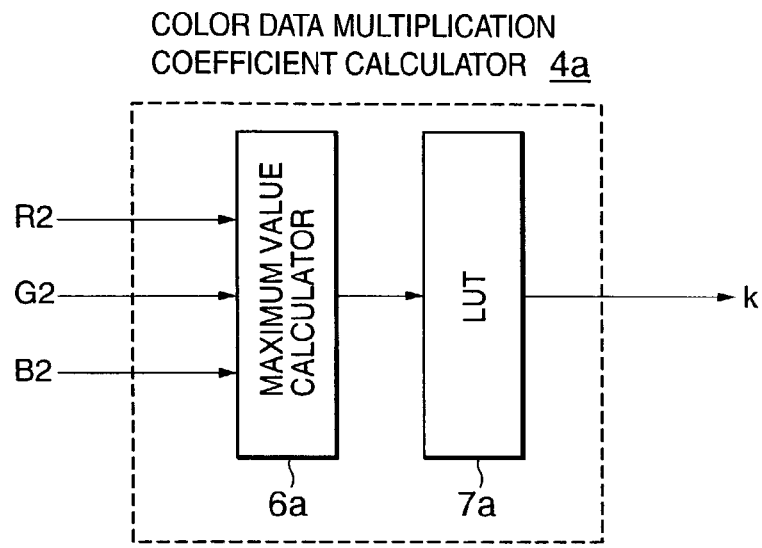
FIG. 3 is a block diagram showing the configuration of the color data multiplication coefficient calculator.

FIG. 3 shows the configuration of the color data multiplication coefficient calculator 4a. It includes a maximum value calculator 6a and a look-up table (LUT) 7a. The maximum value calculator 6a selects the maximum value of the second color data R2, G2, B2, and outputs it to the look-up table 7a. The look-up table 7a outputs the color data multiplication coefficient k based on the maximum value of the second color data R2, G2, B2. The maximum value of the second color data R2, G2, B2 is input to the look-up table 7a, as a read address, and the look-up table 7a outputs the corresponding color data multiplication coefficient k.

The characteristics of the color data multiplication coefficient k stored in the look-up table 7a is determined in accordance with the matrix coefficients used for the color conversion performed by the color converter 1a. For instance, when the color conversion is performed in accordance with the following matrix calculation formula (3), the characteristics of the corresponding color data multiplication coefficient k is determined as follows:

$$\begin{bmatrix} R2 \\ G2 \\ B2 \end{bmatrix} = \begin{bmatrix} 1.2 & 0 & 0 \\ 0 & 1.2 & 0 \\ 0 & 0 & 1.2 \end{bmatrix} \begin{bmatrix} R1 \\ G1 \\ B1 \end{bmatrix} \quad (3)$$

The above matrix calculation formula (3) is for a conversion which increases the lightness of the first color data R1, G1, B1. When the color conversion is performed in accordance with the formula (3), the values of the second color data will be in the range of 0 (=0×1.2) to 306 (=255×1.2). The maximum value of the second color data R2, G2, B2 output from the maximum value calculator 6a will also be in the range of 0 to 306.

Figure 4:
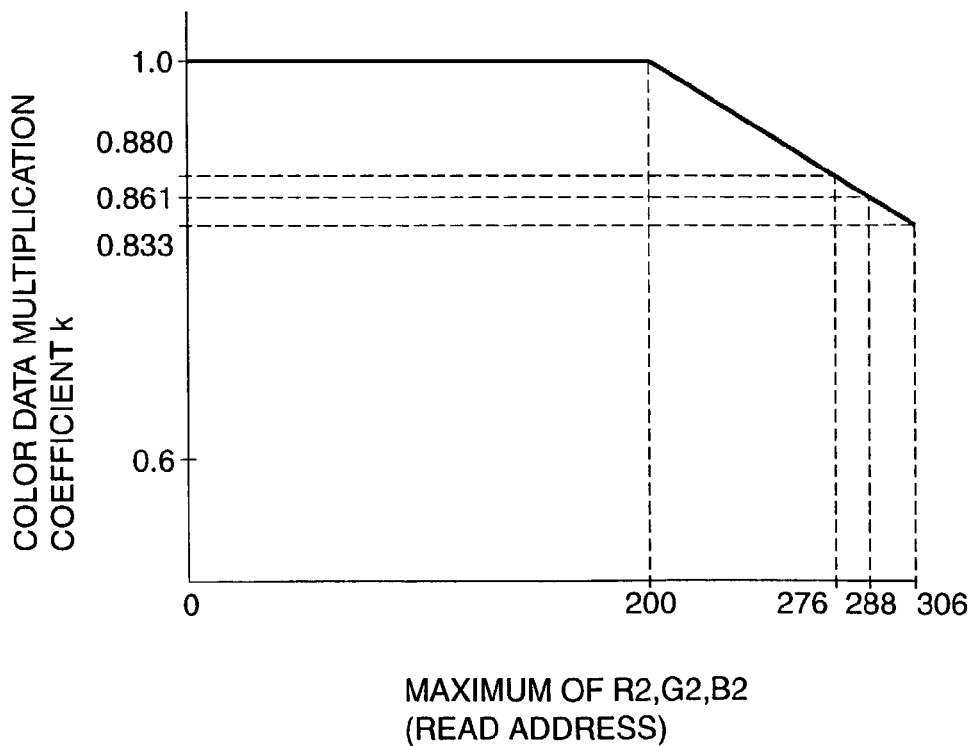
FIG. 4 is a graph showing the characteristics of the color data multiplication coefficient.

FIG. 4 shows characteristics of the color data multiplication coefficient k in the present embodiment, and shows the value of the color data multiplication coefficient k against the maximum value of the second color data R2, G2, B2. As will be seen from FIG. 4, the color data multiplication coefficient k is "1" when the maximum value of the second color data R2, G2, B2 is not more than "200." When the maximum value is larger than "200," the color data multiplication coefficient k decreases monotonically with the increase of the maximum value. Accordingly, in the range in which the maximum value of the second color data is not more than "200,", the third color data is equal to the second color data, while in the range in which the maximum value of the second color data is more than "200," the third color data is smaller than the second color data. When the maximum value of the second color data R2, G2, B2 is "306," the color data multiplication coefficient k is set to be 0.833 (=255/306) such that the second color data is converted to the color data of the maximum gradation level which can be displayed by the display device.

A specific example of the operation of the color conversion apparatus shown in FIG. 1 will next be described. For two different sets of color data with: R1=230, G1=20, B1=20; and R1=240, G1=20, B1=20 which are input as the first color data to the color converter 1a, the second color data obtained by the color conversion according the above matrix calculation formula (3) will have values: R2=276, G2=24, B2=24; and R2=288, G2=24, B2=24, respectively.

The color data compressor 3a multiplies the second color data by different values of the color data multiplication coefficient k corresponding to the respective maximum values "276" and "288" of the second color data R2, G2, B2, to output the third color data R3, G3, B3. As shown in FIG. 4, the multiplication coefficient k corresponding to the maximum values "276" and "288" are 0.880 and 0.861, respectively. Accordingly, the third color data will have values: R3=243, G3=21, B3=21; and R3=248, G3=21, B3=21, so that the color conversion which increases the lightness is performed without causing color contraction.

As is illustrated by the above specific example, the color conversion apparatus of the present embodiment multiplies the second color data R2, G2, B2 obtained by the color conversion, by a predetermined coefficient, so as to convert the second color data to color data of the number of gradation levels which can be displayed by the display device, so that it is possible to avoid color contraction accompanying the conventional color conversion which increases the lightness.

Moreover, as shown in FIG. 4, when the maximum value of the second color data R2, G2, B2 is more than a predetermined value, the value of the color data multiplication coefficient k is decreased with the increase of the maximum value, while when the maximum value is not more than the predetermined value, the value of the color data multiplication coefficient k is fixed to "1." Accordingly, reduction in the lightness due to unnecessary color gamut compression processing is avoided, and the color gamut compression is applied only to the color data having a high lightness which may be associated with color contraction.

Moreover, the same color data multiplication coefficient k is used for multiplication with each of the R, G, B components of the second color data in the color gamut compression processing, so that the ratio between the R, G, B components in the second color data is preserved in the third color data. The ratio between the R, G, B components in the color data is the hue information of the color, and the visual sense of the human being is very sensitive to the change in the hue. Because the color conversion apparatus of the present embodiment performs color gamut compression while preserving the hue information of the second color data, desired color conversion can be achieved without causing color contraction.

In the present embodiment, the color data multiplication coefficient calculator 4a is formed of the look-up table 7a. The memory capacity may be reduced if a calculation circuit is used in combination with a look-up table, for interpolation between data points stored in the look-up table.

Also, by rewriting the contents of the look-up table 7a, the characteristics of the color data multiplication coefficient k can be flexibly altered in conformity with the display characteristics of the display unit, and the conversion characteristics of the color converter 1a.

The color conversion apparatus shown in FIGS. 1 to 3 can also be implemented by software. However, when moving pictures are processed in real time, and in particular when a high-speed processing is required, a configuration using hardware is preferred.

The color conversion processing and the color gamut compression processing according to the present embodiment can be applied not only to color data consisting of three primary colors, but also to color data consisting of four or more color components.

Embodiment 2.

Figure 5:
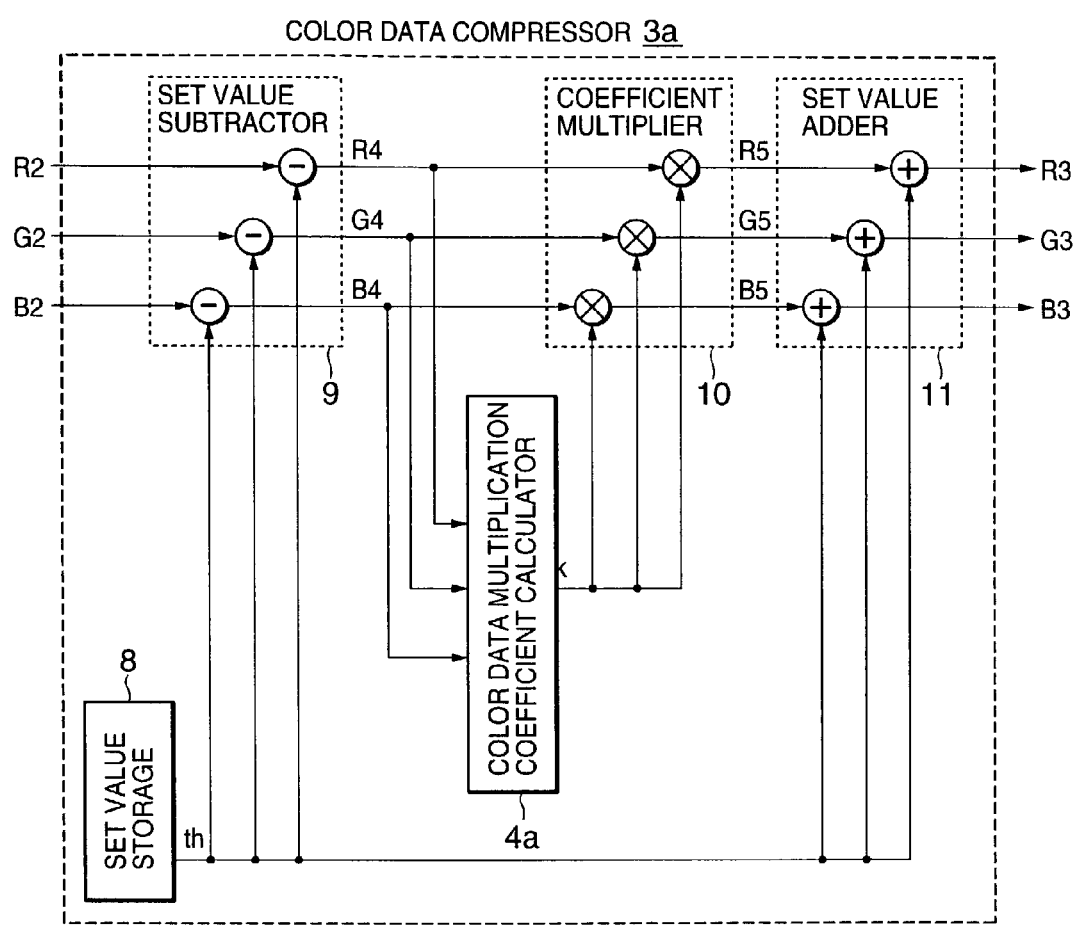
FIG. 5 is a block diagram showing the configuration of the color data compressor according to Embodiment 2.

FIG. 5 is a block diagram showing another configuration of the color data compressor 3a. As illustrated in FIG. 5, the color data compressor 3a of Embodiment 2 comprises a color data multiplication coefficient calculator 4a, a set value storage 8, a set value subtractor 9, a coefficient multiplier 10, and a set value adder 11.

The set value storage 8 outputs a predetermined set value th, and sends it to the set value subtractor 9 and the set value adder 11. The set value subtractor 9 subtracts the set value th from each of the second color data R2, G2, B2 output from the color converter 1a (FIG. 1). The output data R4, G4, B4 from the set value subtractor 9 are given by the following formula (4).

$$R4 = R2 - th$$

$$G4 = G2 - th$$

$$B4 = B2 - th \quad (4)$$

The color data multiplication coefficient calculator 4a is formed of a maximum value calculator 6a and a look-up table 7a, as in Embodiment 1 (see FIG. 3), and outputs a color data multiplication coefficient k based on the maximum value of the data R4, G4, B4 output from the set value subtractor 9. The coefficient multiplier 10 multiplies the output data R4, G4, B4 of the set value subtractor 9, by the color data multiplication coefficient k output from the color data multiplication coefficient calculator 4a. The output data R5, G5, B5 of the coefficient multiplier 10 is given by the following formula (5).

$$R5 = k \times R4$$

$$G5 = k \times G4$$

$$B5 = k \times B4 \quad (5)$$

The set value adder 11 adds the set value th to the output data R5, G5, B5 of the coefficient multiplier 10. The output data of the set value adder 11 are output as the third color data R3, G3, B3. The third color data R3, G3, B3 output from the set value adder 11 are given by the following formula (6).

$$R3 = R5 + th$$

$$G3 = G5 + th$$

$$B3 = B5 + th \quad (6)$$

The characteristics of the color data multiplication coefficient k output from the color data multiplication coefficient calculator 4a is determined in the following manner. When the color converter 1a (FIG. 1) performs the color conversion processing in accordance with the above matrix calculation formula (3), the values of the second color data R2, G2, B2 are in the range of from "0" to "306." It is assumed here that the set value th determined by the set value storage 8 is "100." The values of the output data R4, G4, B4 of the set value subtractor 9 are in the range of from "−100" to "206," so that the maximum value of the output data R4, G4, B4 of the set value subtractor 9 is also within the range of from "−100" to "206."

When the maximum value of R4, G4, B4 is smaller than "0," i.e., when the maximum value of the second color data R2, G2, B2 is smaller than the set value th=100, by setting the color data multiplication coefficient k to be a constant (=1), the amount of data stored in the look-up table 7a (see FIG. 3) for the respective values of R4, G4, B4 can be reduced. Specifically, when the maximum value of R4, G4, B4 is smaller than "0," the read address of the look-up table 7a is fixed to "0," so as to read the color data multiplication coefficient k=1 at the address.

Figure 6:
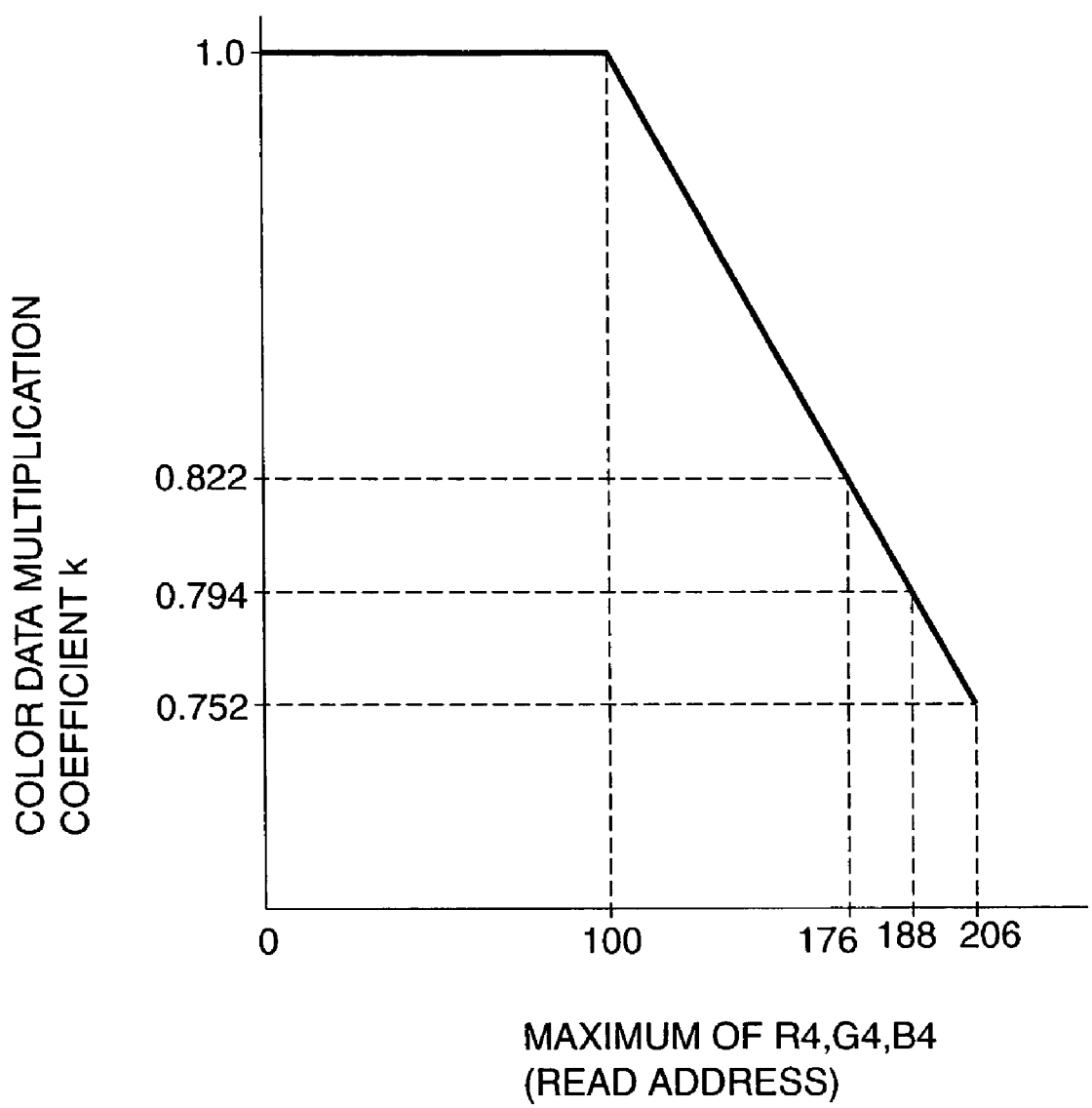
FIG. 6 is a graph showing the characteristics of the color data multiplication coefficient.

FIG. 6 shows characteristics of the color data multiplication coefficient k in the present embodiment. As shown in FIG. 6, when the maximum value of R4, G4, B4 is not more than "100," the color data multiplication coefficient is "1," while when the maximum value is more than "100," the color data multiplication coefficient decreases with increasing maximum value. When the maximum value of R4, G4, B4 is "206," the corresponding color data multiplication coefficient k is $(255-100)/(306-100) = 155/206 = 0.752$.

The operation of the color data compressor 3a shown in FIG. 5 will next be described with reference to a specific example. Converting the first color data with R1=230, G1=20, B1=20 in accordance with the above matrix calculation formula (3) results in the second color data with R2=276, G2=24, B2=24. In this case, the output data of the set value subtractor 9 will have values: R4=176, G4=−76, B4=−76. The color data multiplication coefficient calculator 4a outputs the color data multiplication coefficient k based on the maximum value of R4, G4, B4, and the coefficient multiplier 10 multiplies the R4, G4, B4 by the output color data multiplication coefficient k.

As shown in FIG. 6, the color data multiplication coefficient k corresponding to the maximum value 176 of R4, G4, B4 is 0.822. Accordingly, the output data of the coefficient multiplier 10 will have values: R5=145, G5=−62, B5=−62. The set value adder 11 adds the set value th=100 to the color data R5, G5, B5, to produce the third color data with R3=245, G3=38, B3=38.

When similar color conversion is applied to the first color data with R1=240, G1=20, B1=20, the second color data will have values R2=288, G2=24, B2=24. In this case, the output data of the set value subtractor 9 will have values R4=188, G4=−76, B4=−76.

As shown in FIG. 6, the color data multiplication coefficient k corresponding to the maximum value 188 of R4, G4, B4 is 0.794. Accordingly, the output data of the coefficient multiplier 10 will have values R5=149, G5=−60, B5=−60. The set value adder 11 adds the set value th=100 to the color data R5, G5, B5, to produce the third color data with R3=249, G3=40, B3=40.

As will be understood, the two sets of the first color data with values: R1=230, G1=20, B1=20; and R1=240, G1=20, B1=20 representing different colors are converted to the third color data with values: R3=245, G3=38, B3=38; and R3=249, G3=40, B3=40 without causing color contraction.

Embodiment 3.

Figure 7:
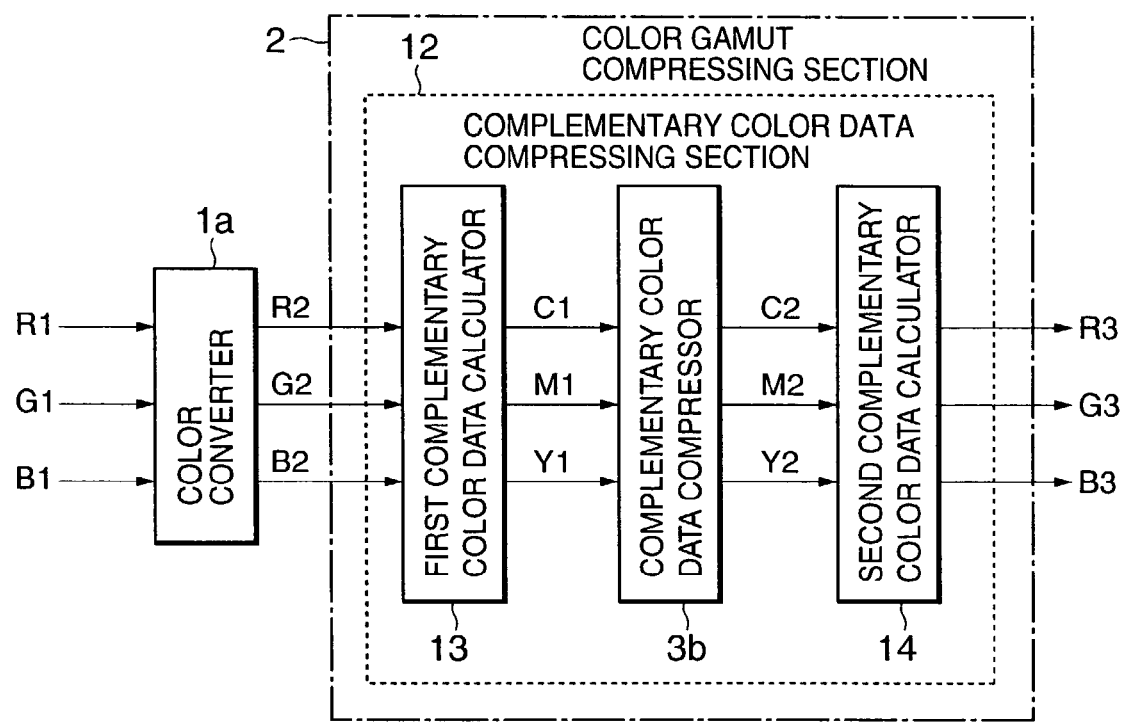
FIG. 7 is a block diagram showing the configuration of the color conversion apparatus according to Embodiment 2.

FIG. 7 is a block diagram showing another configuration of a color conversion apparatus. As shown in FIG. 7, the color gamut compressing section 2 of the color conversion apparatus according to the present embodiment comprises a complementary color data compressing section 12, which in turn includes a first complementary color data calculator 13, a complementary color data compressor 3b, and a second complementary color data calculator 14. The main function of the complementary color data compressing section 12 shown in FIG. 7 is to perform color gamut compression for avoiding color contraction due to color conversion which increases saturation.

The first complementary color data calculator 13 determines the complements of the second color data R2, G2, B2 output from the color converter 1a, in accordance with the following formula (7), to output complementary color data C1, M1, Y1 representing complements of the second color data. The complementary color data C1, M1, Y1 represent the gradation levels of cyan, magenta, yellow (C, M, Y) corresponding to the complements of the second color data R2, G2, Y2.

$$C1=255-R2$$

$$M1=255-G2$$

$$Y1=255-B2 \qquad (7)$$

When the second color data R2, G2, B2 are color data of 10 bits with a sign, and assumes a value of −512 to 511, the complementary color data C1, M1, Y1 assumes a value of −256 to 767. Accordingly, the complementary color data C1, M1, Y1 represent gradation levels of the complementary colors by a value in the range of −256 to 767. There are 1023 integer values in the range of −256 to 767, and they can be represented by 10-bit data. The complementary color data compressor 3b outputs compressed complementary color data C2, M2, Y2 obtained by conversion of the complementary color data C1, M1, Y1 into complementary color data of 8 bits which can be displayed by the display device. The second complementary color data calculator 14 determines the complements of the complementary color data C2, M2, Y2 in accordance with the following formula (8), to output third color data R3, G3, B3 of 8 bits.

As an alternative to determining the complements in accordance with the formula (7), the second color data R2, G2, B2 may be subtracted from "511" to produce the complementary color data C1, M1, Y1. In this case, the complementary color data C1, M1, Y1 will have values in the range of 0 to 1023.

$$R3=255-C2$$

$$G3=255-M2$$

$$B3=255-Y2 \qquad (8)$$

Figure 8:
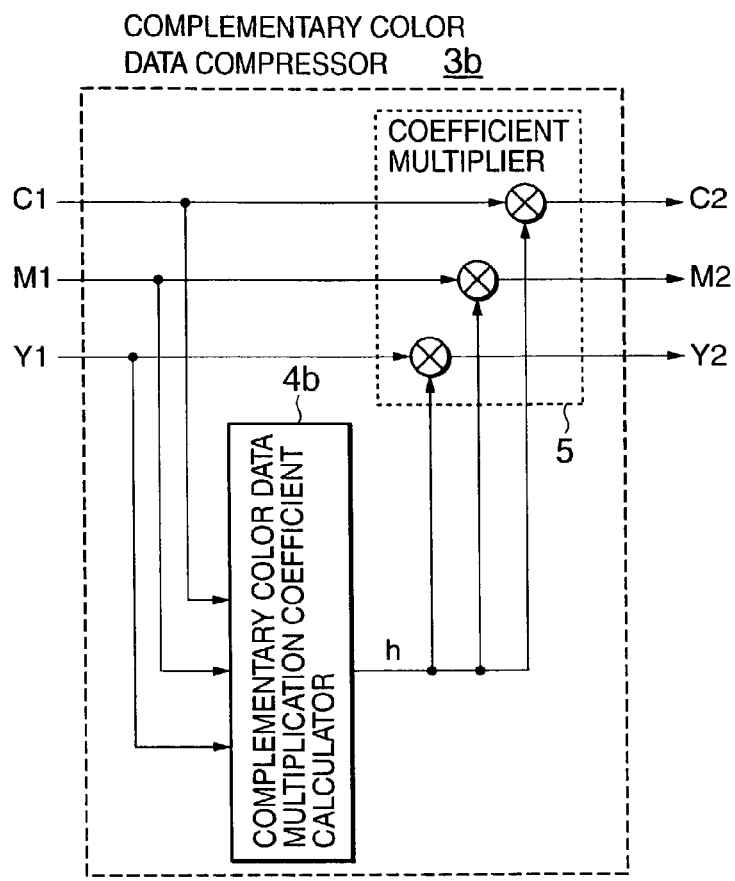
FIG. 8 is a block diagram showing the configuration of the complementary color data compressor.

FIG. 8 is a block diagram showing the configuration of the complementary color data compressor 3b. The complementary color data C1, M1, Y1 output from the first complementary color data calculator 13 are input to a complementary color data multiplication coefficient calculator 4b, and a coefficient multiplier 5. The complementary color data multiplication coefficient calculator 4b outputs a complementary color data multiplication coefficient h based on the complementary color data C1, M1, Y1, and sends it to the coefficient multiplier 5. The coefficient multiplier 5 multiplies the complementary color data C1, M1, Y1 by the complementary color data multiplication coefficient h, to produce compressed complementary color data C2, M2, Y2. The compressed complementary color data C2, M2, Y2 output from the coefficient multiplier 5 are represented by the following formula (9).

$$C2=h \times C1$$

$$M2=h \times M1$$

$$Y2=h \times Y1 \qquad (9)$$

Figure 9:
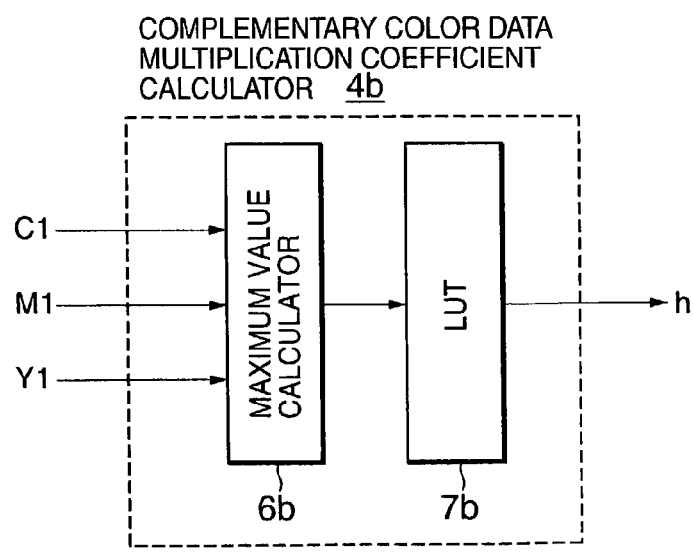
FIG. 9 is a block diagram showing the configuration of the complementary color data multiplication coefficient calculator.

FIG. 9 is a block diagram showing the configuration of the complementary color data multiplication coefficient calculator 4b. A maximum value calculator 6b selects the maximum value of the complementary color data C1, M1, Y1, and outputs it to a look-up table (LUT) 7b. The look-up table 7b outputs the complementary color data multiplication coefficient h, based on the maximum value of the complementary color data C1, M1, Y1.

The characteristics of the complementary color data multiplication coefficient h stored in the look-up table 7b is determined in correspondence with the matrix coefficients for the color conversion performed by the color converter 1a. When the color conversion is performed in accordance with the following matrix calculation formula (10), the characteristics of the corresponding complementary color data multiplication coefficient h is determined in the following way.

$$\begin{bmatrix} R2 \\ G2 \\ B2 \end{bmatrix} = \begin{bmatrix} 1 & -0.1 & -0.1 \\ -0.1 & 1 & -0.1 \\ -0.1 & -0.1 & 1 \end{bmatrix} \begin{bmatrix} R1 \\ G1 \\ B1 \end{bmatrix} \qquad (10)$$

The above matrix calculation formula (10) is a conversion formula that increases the saturation of the first color data R1, G1, B1, and when the color conversion is performed in accordance with the above matrix calculation formula (10), the value of the second color data will be in the range of −51 to 255. Accordingly, the maximum value of the complementary color data C1, M1, Y1 output from the maximum value calculator 6b shown in FIG. 9 will be in the range of 0 to 306, so that the read address of the look-up table 7b will be from 0 to 306.

Figure 10:
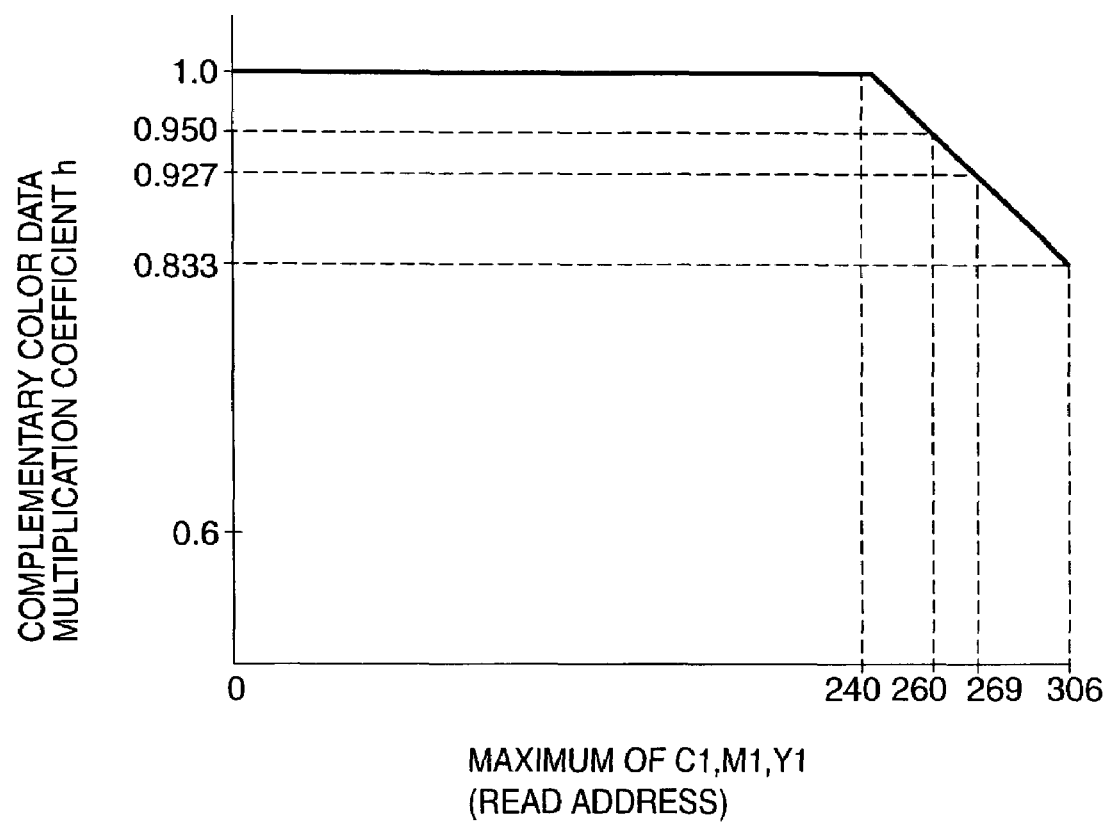
FIG. 10 is a graph showing the characteristics of the complementary color data multiplication coefficient.

FIG. 10 shows characteristics of the complementary color data multiplication coefficient h th in the present embodiment. FIG. 10 shows the value of the complementary color data multiplication coefficient h against the maximum value (read address) of the complementary color data C1, M1, Y1, which is supplied to the look-up table 7b as the read address. As shown in FIG. 10, the complementary color data multiplication coefficient h is "1" when the maximum value of the complementary color data C1, M1, Y1 is not more than "240," and monotonically decreases with increase of the maximum value in excess of "240." When the maximum value of C1, M1, Y1 is "306," the complementary color data multiplication coefficient h is set to 0.833 (=255/306) such that the compressed complementary color data C2, M2, Y2 will be the color data of the maximum gradation level which can be displayed by the image display device.

The operation of the color conversion apparatus shown in FIG. 7 will next be described with reference to a specific numerical value example.

For two different sets of the color data with: R1=230, G1=10, B1=10; and R1=230, G1=20, B1=20 that are input to the color converter 1a as the first color data, the second color data obtained in accordance with the color conversion the above matrix calculation formula (10) will have values: R2=228, G2=−14, B2=−14; and R2=228, G2=−5, B2=−5, respectively.

The first complementary color data calculator 13 determines the complements of the second color data in accordance with the above formula (7) to produce complementary color data with values: C1=27, M1=269, Y1=269; and C1=27, M1=260, Y1=260, respectively.

The complementary color data compressor 3b multiplies the first complementary color data with the complementary color data multiplication coefficient h corresponding to the complementary color data M1, C1, Y1, to produce the compressed complementary color data M2, C2, Y2. As shown in FIG. 10, the values of the complementary color data multiplication coefficient h corresponding to the maximum values 269 and 260 are 0.927 and 0.950, respectively. Accordingly, the compressed complementary color data will have values: C2=25, M2=249, Y2=249; and C2=26, M2=247, Y2=247, respectively.

The second complementary color data calculator 14 determines the complements of the above compressed complementary color data C2, Y2, M2 in accordance with the above formula (8), to produce third color data with values: R3=230, G3=6, B3=6; and R3=229, G3=8, B3=8, respectively.

As shown with reference to the above specific example, by applying the color gamut compression processing to the complementary color data of the second color data, it is possible to avoid color contraction due to the color conversion which increases saturation.

Moreover, as shown in FIG. 10, when the maximum value of the complementary color data M1, C1, Y1 is larger than a predetermined value, the value of the complementary color data multiplication coefficient h is reduced with increase of the maximum value, while when the maximum value is smaller, the color data multiplication coefficient h is fixed to "1," so that it is possible to perform color gamut compression on only the color data having a high saturation liable to color contraction, and it is possible to avoid reduction in the saturation due to unnecessary color gamut compression.

Also, in the color gamut compression, an identical complementary color data multiplication coefficient h is used for multiplication with the M, C, Y components of the complementary color data, so that the ratio between the M, C, Y components of the complementary color data is preserved in the compressed complementary color data M2, Y2, C2. As a result, the hue information of the second color data R2, G2, B2 corresponding to the complementary color data M1, C1, Y1 will be preserved in the third color data R3, G3, B3 corresponding to the compressed complementary color data M2, C2, Y2. As has been described, the color conversion apparatus according to the present embodiment performs color gamut compression while preserving the hue information of the second color data, so that it can achieve desired color conversion without causing color contraction, as in the previous embodiments.

Embodiment 4.

Figure 11:
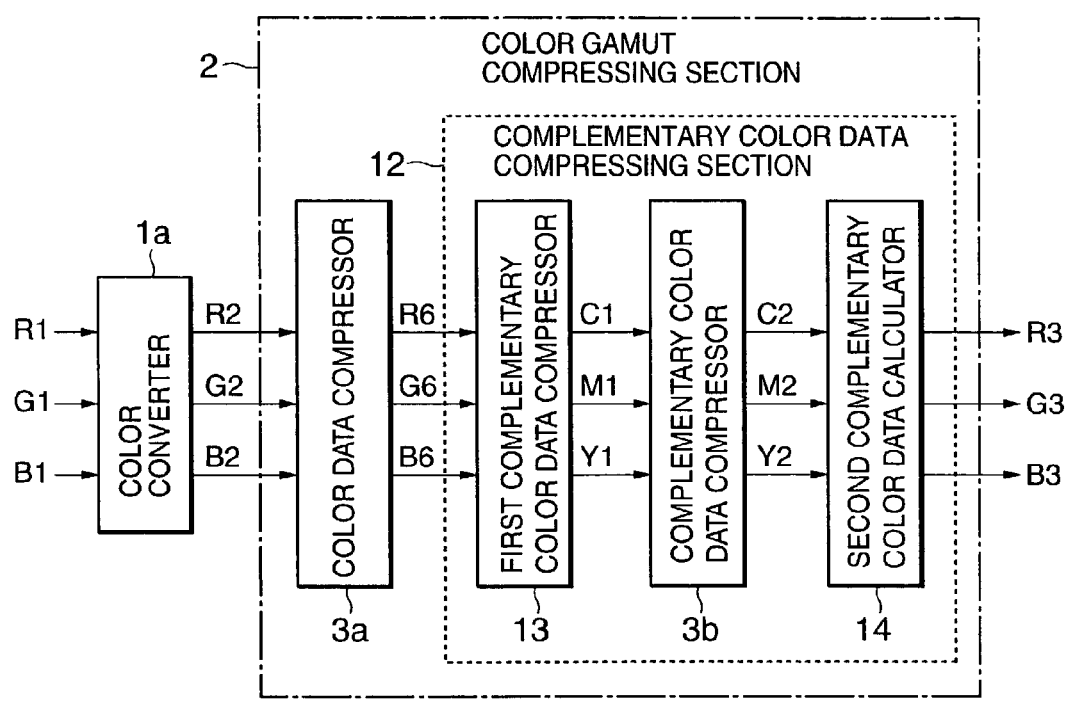
FIG. 11 is a block diagram showing the configuration of the color conversion apparatus according to Embodiment 4.

FIG. 11 is a block diagram showing another configuration of a color conversion apparatus. As shown in FIG. 11, the color gamut compressing section 2 of the color conversion apparatus according to Embodiment 4 includes a color data compressor 3a, and a complementary color data compressing section 12, which in turn includes a first complementary color data calculator 13, a complementary color data compressor 3b, and a second complementary color data calculator 14. The color gamut compressing section 2 shown in FIG. 11 performs color gamut compression for avoiding color contraction accompanying color conversion that increases lightness and saturation.

The second color data output from the color converter 1a is color data of 10 bits with a sign, and can assume a value of from −512 to 511. The color data compressor 3a has a configuration similar to that shown in the block diagram of FIG. 2. Applying color gamut compression explained in connection with Embodiment 1 to the second color data R2, G2, B2, it outputs compressed color data R6, G6, B6 with the maximum value being set to "255." The range of the value of the compressed color data R6, G6, B6 will be from −512 to 255.

The first complementary color data calculator 13 determines the complements of the compressed color data R6, G6, B6 in accordance with the following formula (11) to produce complementary color data C1, M1, Y1.

$$C1 = 255 - R6$$

$$M1 = 255 - G6$$

$$Y1 = 255 - B6 \quad (11)$$

As a result of the above-mentioned calculation of the complements, the value of the complementary color data C1, M1, Y1 will be in the range of 0 to 767. The complementary color data compressor 3b has a configuration similar to that shown in the block diagram of FIG. 8, and applies the color gamut compression explained in connection with Embodiment 3, to the complementary color data C1, M1, Y1, to produce compressed complementary color data C2, M2, Y2 of 8 bits with the maximum being 255. The second complementary color data calculator 14 determines the complements of the compressed complementary color data C2, M2, Y2 in accordance with the above formula (8) to produce third color data R3, G3, B3 of 8 bits.

Characteristics of the color data multiplication coefficient k, and complementary color data multiplication coefficient h used in the color gamut compression in the color data compressor 3a (FIG. 2), and the complementary color data compressor 3b (FIG. 8) are determined in correspondence with the matrix calculation formula used in the color conversion. When the color converter 1a performs color conversion in accordance with the following matrix calculation formula (12), the characteristics of the corresponding color data multiplication coefficient k, and complementary color data multiplication coefficient h are determined in the following manner.

$$\begin{bmatrix} R2 \\ G2 \\ B2 \end{bmatrix} = \begin{bmatrix} 1.2 & -0.1 & -0.1 \\ -0.1 & 1.2 & -0.1 \\ -0.1 & -0.1 & 1.2 \end{bmatrix} \begin{bmatrix} R1 \\ G1 \\ B1 \end{bmatrix} \quad (12)$$

The matrix calculation formula shown in the formula (12) is for performing conversion that increases the lightness and saturation of the first color data R1, G1, B1, and when the color conversion is performed in accordance with the above matrix calculation formula (12), the values of the second color data R2, G2, B2 will be within the range of −51 to 306. The result is that the maximum value of the second color data R2, G2, B2 output from the maximum value calculator 6a (FIG. 3) to the look-up table 7a will be within the range of from −51 to 306. When the maximum value of the second color data R2, G2, B2 is not more than 0, the color data multiplication coefficient k is set to a constant (=1). Specifically, the read address of the look-up table 7a is fixed to '0', and the color data multiplication coefficient k=1 is output.

Figure 12:
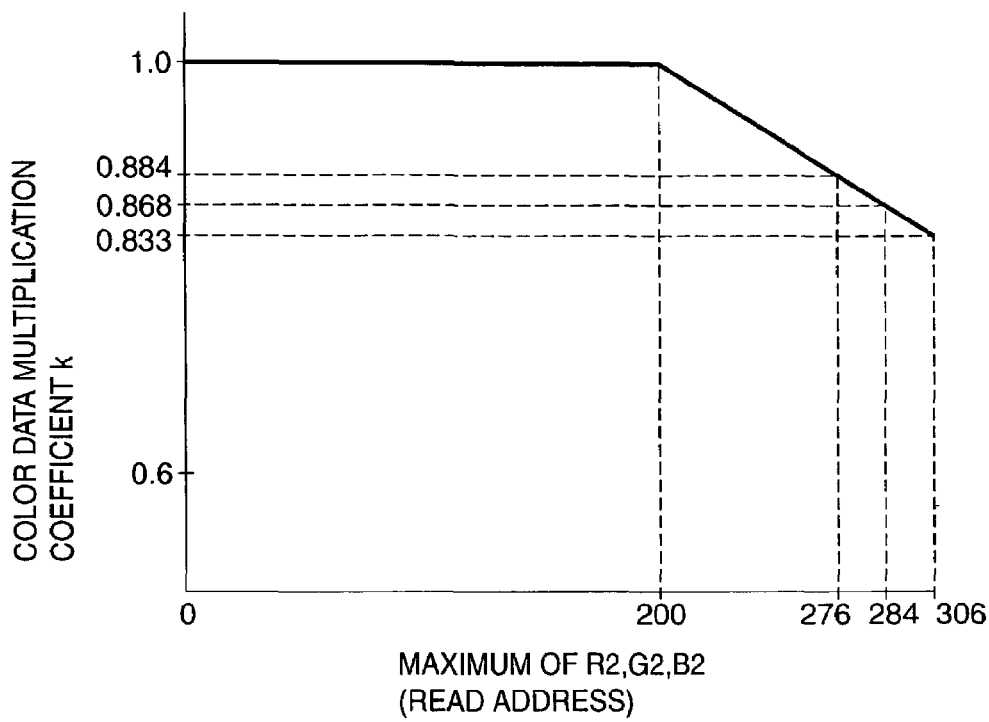
FIG. 12 is a graph showing the characteristics of the color data multiplication coefficient.

FIG. 12 shows characteristics of the color data multiplication coefficient k according to the present embodiment. As shown in FIG. 12, the color data multiplication coefficient k is "1," when the maximum value of the second color data R2, G2, B2 is not more than 200; it monotonically decreases with increase in the maximum value in excess of 200; and it is 0.833 (=255/306) when the maximum value is 306.

By multiplying the second color data R2, G2, B2 with the color data multiplication coefficient k having a characteristics shown in FIG. 12, the second color data R2, G2, B2 are converted to compressed color data R6, G6, B6 assuming a value in the range of −51 to 255. Accordingly, the values of the complementary color data C1, M1, Y1 obtained by determining the complements of the compressed color data R6, G6, B6 in accordance with the above formula (11) will be in the range of 0 to 306, so that the maximum value of C1, M1, Y1 output from the maximum value calculator 6b (FIG. 9) to the look-up table 7b also ranges from 0 to 306.

Figure 13:
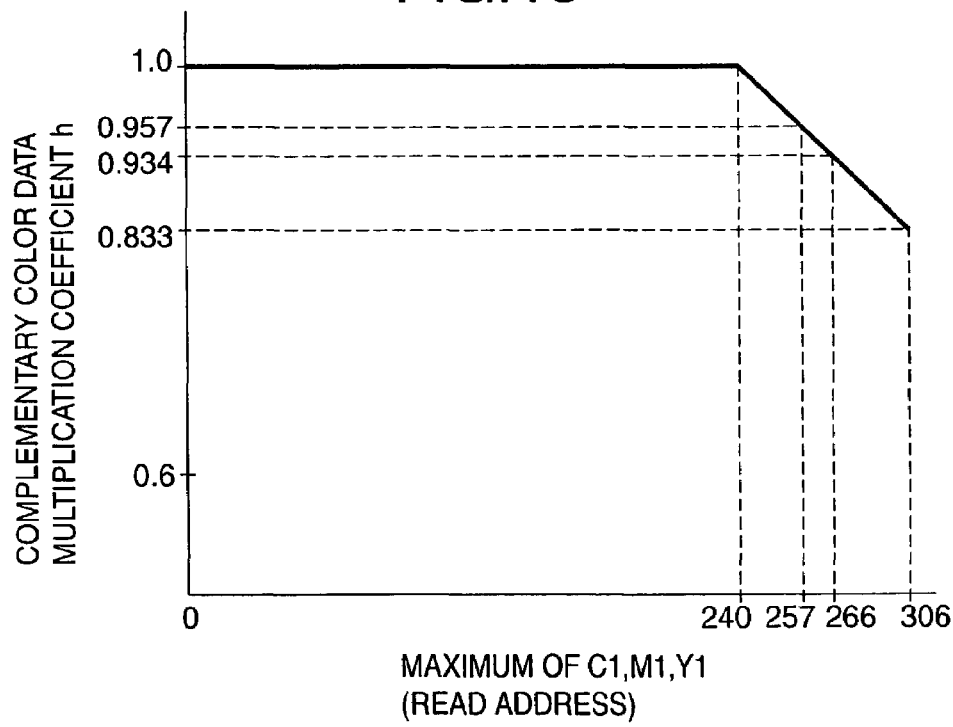
FIG. 13 is a graph showing the characteristics of the complementary color data multiplication coefficient.

FIG. 13 shows characteristics of the complementary color data multiplication coefficient h according to the present embodiment. As shown in FIG. 13, the complementary color data multiplication coefficient h is "1," when the maximum value of the complementary color data C1, M1, Y1 is not more than "240;" it monotonically decreases with increase in the maximum value in excess of "240;" and it is 0.833 (=255/306) when the maximum value of the complementary color data C1, M1, Y1 is "306."

The operation of the color conversion apparatus according to the present embodiment will next be described with reference to a specific example.

For two different sets of the first color data with values: R1=230, G1=10, B1=10; and R1=240, G1=20, B1=20 that are input to the color converter 1a, the second color data obtained as a result of the color conversion in accordance with the matrix calculation formula (12) will have values: R2=274, G2=−12, B2=−12; and R2=284, G2=−2, B2=−2, respectively.

The color data compressor 3a multiplies the second color data with a corresponding color data multiplication coefficient k to produce compressed color data R6, G6, B6. As shown in FIG. 12, the values of the color data multiplication coefficient k corresponding to the maximum values 274 and 284 of the second color data R2, G2, B2 are 0.884 and 0.868, respectively. Accordingly, the compressed color data will have values: R6=242, G6=−11, B6=−11; and R6=247, G6=−2, B6=−2, respectively.

The first complementary color data calculator 13 determines the complements of the compressed color data in accordance with the above formula (11), to produce complementary color data with values: C1=13, M1=266, Y1=266; and C1=8, M1=257, Y1=257, respectively.

The complementary color data compressor 3b multiplies the complementary color data with a corresponding complementary color data multiplication coefficient h, to produce compressed complementary color data C2, M2, Y2. As shown in FIG. 13, the values of the complementary color data multiplication coefficient h corresponding to the maximum values 266 and 257 of the complementary color data C1, M1, Y1 are 0.934 and 0.957, respectively. Accordingly, the compressed complementary color data will have values: C2=12, M2=248, Y2=248; and C2=8, M2=246, Y2=246, respectively.

By determining the complements of the compressed complementary color data C2, M2, Y2 in accordance with the formula (8), at the second complementary color data calculator 14, the resultant third color data will have values: R3=243, G3=7, B3=7; and R3=247, G3=9, B3=9, respectively. Accordingly, color conversion of the first color data (with R1=230, G1=10, B1=10; and R1=240, G1=20, B1=20) that increases the lightness and saturation can be achieved without causing color contraction.

The color gamut compressing section 2 according to the present embodiment applies color gamut compression to the second color data, to produce compressed color data, and applies color gamut compression to the complementary color data of the compressed color data, so that it is possible to avoid color contraction which may otherwise be associated with color conversion that increases lightness and saturation/.

Also, in the color gamut compression, an identical color data multiplication coefficient k and an identical complementary color data multiplication coefficient h are used for multiplication with the respective components of the second color data R2, G2, B2, and complementary color data C1, M1, Y1, so that the ratio between the R, G, B components of the second color data is preserved in the third color data. As was described, the color conversion apparatus according to the present embodiment performs color gamut compression while preserving the hue information of the second color data, so that desired color conversion can be achieved without causing color contraction.

Embodiment 5.

Figure 14:
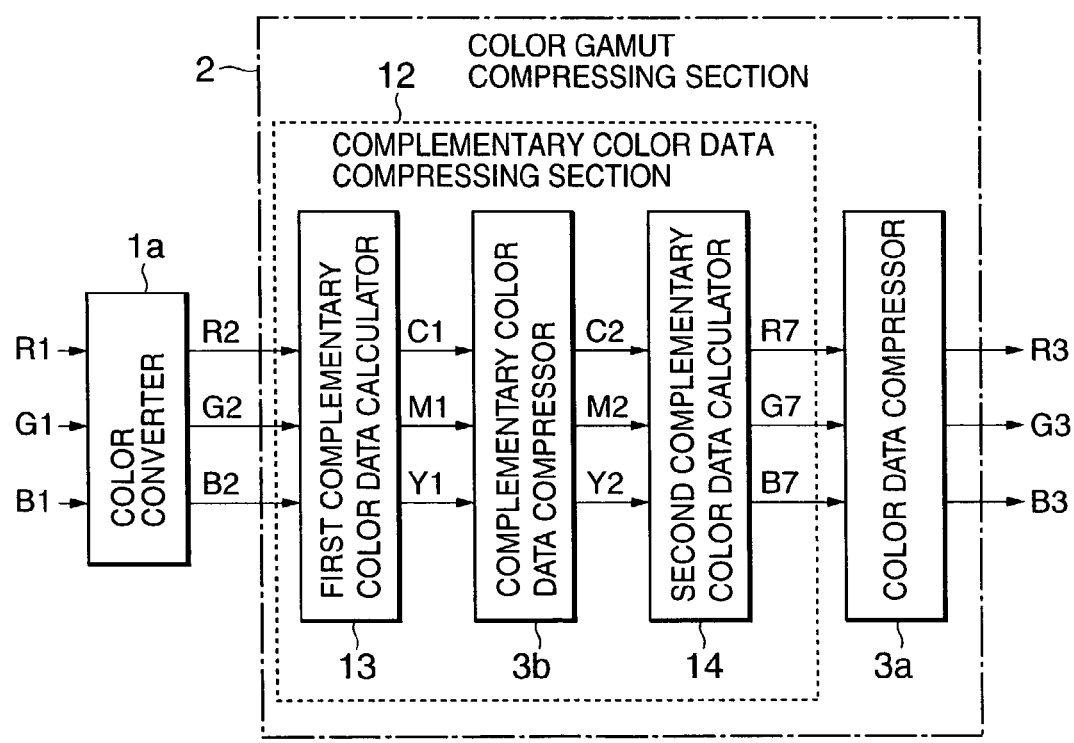
FIG. 14 is a block diagram showing the configuration of the color conversion apparatus according to Embodiment 5.

FIG. 14 is a block diagram showing another configuration of color conversion apparatus. The color gamut compressing section 2 according to this embodiment is a variation of that of Embodiment 4 shown in FIG. 11, and differs from the latter in that the complementary color data compressing section 12 is provided in front of the color data compressor 3a.

The first complementary color data calculator 13 determines the complements of the second color data R2, G2, B2 output from the color converter 1a, in accordance with the above formula (7), to produce complementary color data C1, M1, Y1. The second color data can assume a value ranging from −512 to 511, so that the complementary color data C1, M1, Y1 will have a value ranging from −256 to 767.

The complementary color data compressor 3b has a configuration similar to that shown in the block diagram of FIG. 8, and applies color gamut compression, similar to that described in connection with Embodiment 3, to the complementary color data C1, M1, Y1, to produce compressed complementary color data C2, M2, Y2 with the maximum being 255.

The second complementary color data calculator 14 determines the complements of the compressed complementary color data C2, M2, Y2, in accordance with the following formula (13), to produce compressed color data R7, G7, B7.

$$R7 = 255 - C2$$

$$G7 = 255 - G2$$

$$B7 = 255 - B2 \qquad (13)$$

The compressed complementary color data C2, M2, Y2 can assume a value ranging from −256 to 255, so that the values of the compressed color data R7, G7, B7 range from 0 to 511. The color data compressor 3a has a configuration similar to that shown in the block diagram of FIG. 2, and applies color gamut compression, described in connection with Embodiment 1, to the compressed color data R7, G7, B7, to produce third color data R3, G3, B3 of 8 bits with the maximum value being 255.

Characteristics of the color data multiplication coefficient k and the complementary color data multiplication coefficient h used for color gamut compression performed by the color data compressor 3a (FIG. 2) and the complementary color data compressor 3b (FIG. 8) are determined in correspondence with the matrix calculation formula used in the color conversion. When the color converter 1a performs color conversion in accordance with the above matrix calculation formula (12), the characteristics of the corresponding color data multiplication coefficient k and the complementary color data multiplication coefficient h are determined in the following manner.

When color conversion is performed in accordance with the above matrix calculation formula (12), the values of the second color data R2, G2, B2 will range from −51 to 306. Accordingly, the values of the complementary color data C1, M1, Y1 output from the first complementary color data calculator 13 will range from −51 to 306. Accordingly, the maximum value of the complementary color data C1, M1, Y1 output from the maximum value calculator 6b (FIG. 9) of the complementary color data compressor 3b to the look-up table 7b will range from −51 to 306. When the maximum value of C1, M1, Y1 is not more than 0, the complementary color data multiplication coefficient h is set to a constant (=1). Specifically, the read address of the look-up table 7b is fixed to '0,' and the complementary color data multiplication coefficient h=1 is output.

Figure 15:
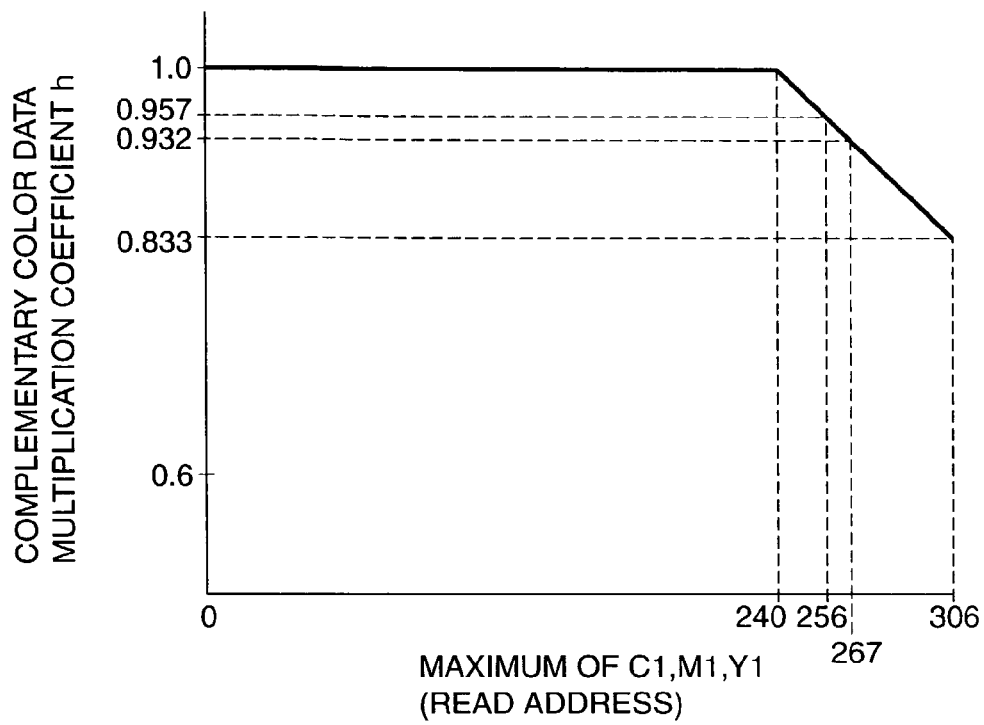
FIG. 15 is a graph showing the characteristics of the complementary color data multiplication coefficient.

FIG. 15 shows the characteristics of the complementary color data multiplication coefficient h according to the present embodiment. As shown in FIG. 15, the complementary color data multiplication coefficient h is "1," when the maximum value of the complementary color data C1, M1, Y1 is not more than 240; it monotonically decreases with increase in the maximum value in excess of 240; and it is 0.833 (=255/306) when the maximum value of C1, M1, Y1 is 306.

By multiplying the complementary color data C1, M1, Y1 with complementary color data multiplication coefficient h having the characteristics shown in FIG. 15, the complementary color data C1, M1, Y1 are converted to compressed complementary color data C2, M2, Y2 having a value ranging from −51 to 255. Accordingly, the values of the compressed color data R7, G7, B7 obtained by determining the complements of the compressed complementary color data C2, M2, Y2 in accordance with the above formula (13) range from 0 to 306. As a result, the maximum value of the compressed color data R7, G7, B7 also ranges from 0 to 306, so that the maximum value of the compressed color data R7, G7, B7 output from the maximum value calculator 6a (FIG. 3) of the color data compressor 3a to the look-up table 7a also ranges from 0 to 306.

Figure 16:
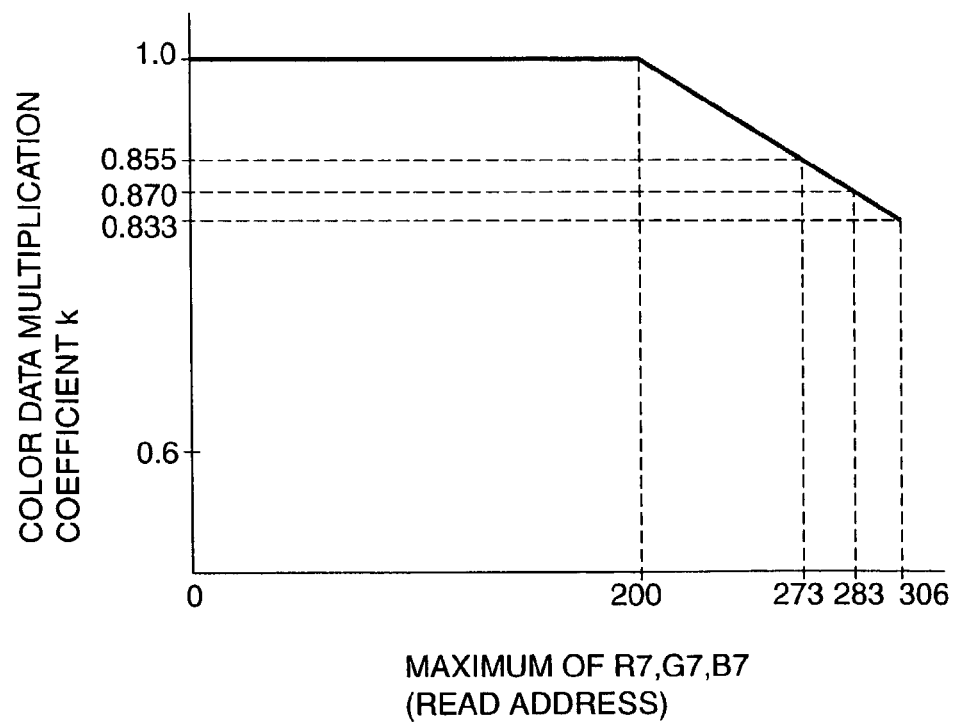
FIG. 16 is a graph showing the characteristics of the color data multiplication coefficient.

FIG. 16 shows characteristics of complementary color data multiplication coefficient h according to the present embodiment. As shown in FIG. 16, the complementary color data multiplication coefficient h is "1," when the maximum value of the compressed color data R7, G7, B7 is not more than "200," and monotonically decreases with increase in the maximum value in excess of 200, and is 0.833 (=255/306) when the maximum value is "306."

The operation of the color conversion apparatus according to the present embodiment will next be described with reference to a specific example. For two sets of the first color data having values: R1=230, G1=10, B1=10; and R1=240, G1=20, B1=20 that are input to the color converter 1a, the second color data obtained as a result of the color conversion in accordance with the matrix calculation formula (12) will have values: R2=274, G2=−12, B2=−12; and R2=284, G2=−2, B2=−2, respectively.

The first complementary color data calculator 13 determines the complements of the second color data in accordance with the above formula (7), to produce complementary color data with values: C1=−19, M1=267, Y1=267; and C1=−29, M1=257, Y1=257, respectively.

The complementary color data compressor 3b multiplies the complementary color data with a corresponding color data multiplication coefficient h, to produce compressed complementary color data C2, M2, Y2. As shown in FIG. 15, the values of the complementary color data multiplication coefficient h corresponding to the maximum values 267 and 257 of the complementary color data C1, M1, Y1 are 0.932 and 0.957, respectively. Accordingly, the compressed complementary color data will have values: C2=−18, M2=249, Y2=249; and C2=−28, M2=246, Y2=246, respectively.

By determining the complements of the compressed complementary color data C2, M2, Y2, at the second complementary color data calculator 14, in accordance with the formula (13), the compressed color data will have values: R7=273, G7=6, B7=6; and R7=283, G7=9, B7=9, respectively.

The color data compressor 3a multiplies the compressed color data with the corresponding color data multiplication coefficient k, to produce the third color data. As shown in FIG. 16, the values of the color data multiplication coefficient k corresponding to the maximum values 273 and 283 of the compressed color data R7, G7, B7 are 0.885 and 0.870, respectively. Accordingly, the third color data will have values: R3=242, G3=5, B3=5; and R3=246, G3=8, B3=8, respectively. Thus, color conversion that increases lightness and saturation is performed without causing color contraction.

As is illustrated by the above specific example, even when the complementary color data compressing section 12 is provided in front of the color data compressor 3a, it is possible, as in the case of the color gamut compressing section 2 in Embodiment 4, to avoid color contraction that may otherwise occur when the color converter 1a performs color conversion which increases lightness and saturation.

Embodiment 6.

Figure 17:
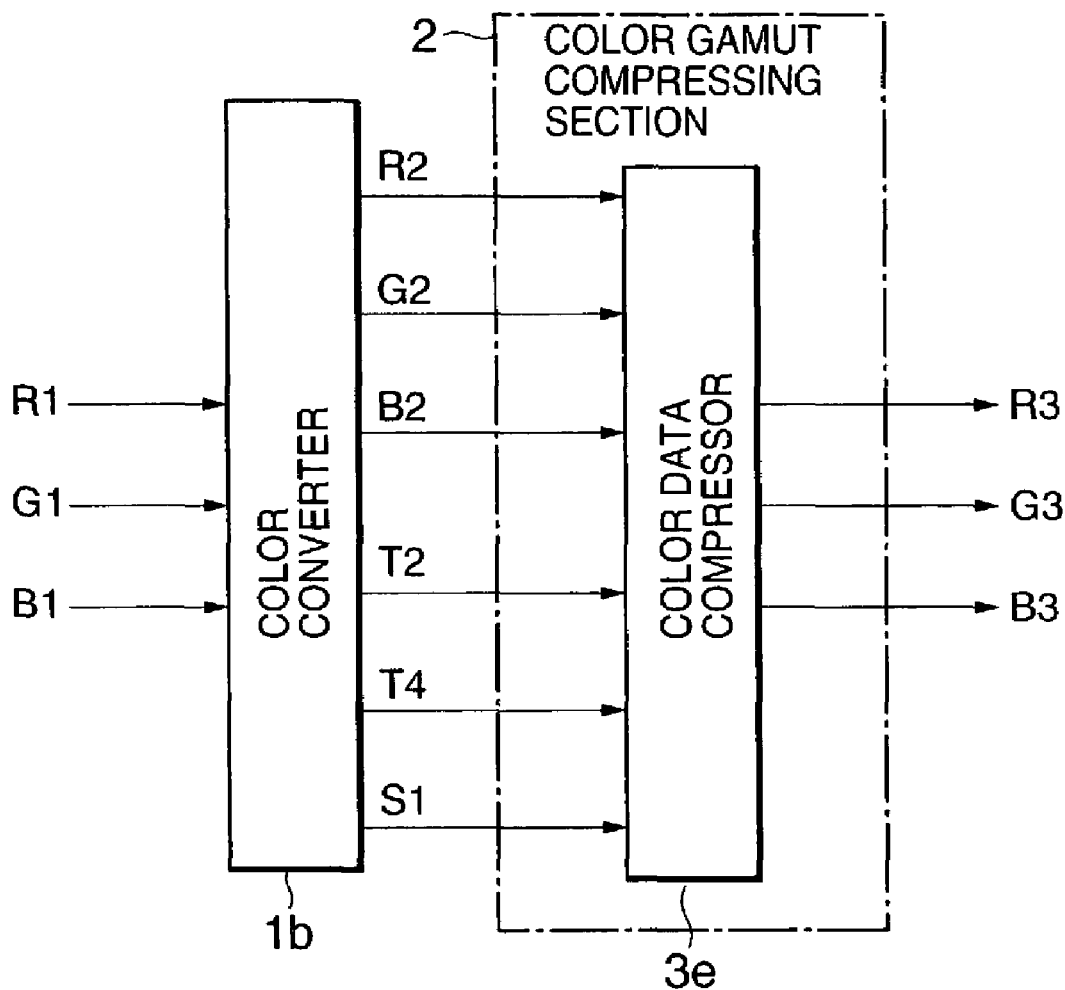
FIG. 17 is a block diagram showing the configuration of the color conversion apparatus according to Embodiment 6.

FIG. 17 is a block diagram showing the configuration of a color conversion apparatus. A color converter 1b according to the present embodiment performs color conversion on the first color data R1, G1, B1 to produce the second color data R2, G2, B2. The color converter 1b also produce polynomial data T2, T4 and an identification code S1, to be described later. A color data compressor 3e applies color gamut compression to the second color data R2, G2, B2, based on the polynomial data T2, T4 and identification code S1, to produce third color data R3, G3, B3.

Figure 18:
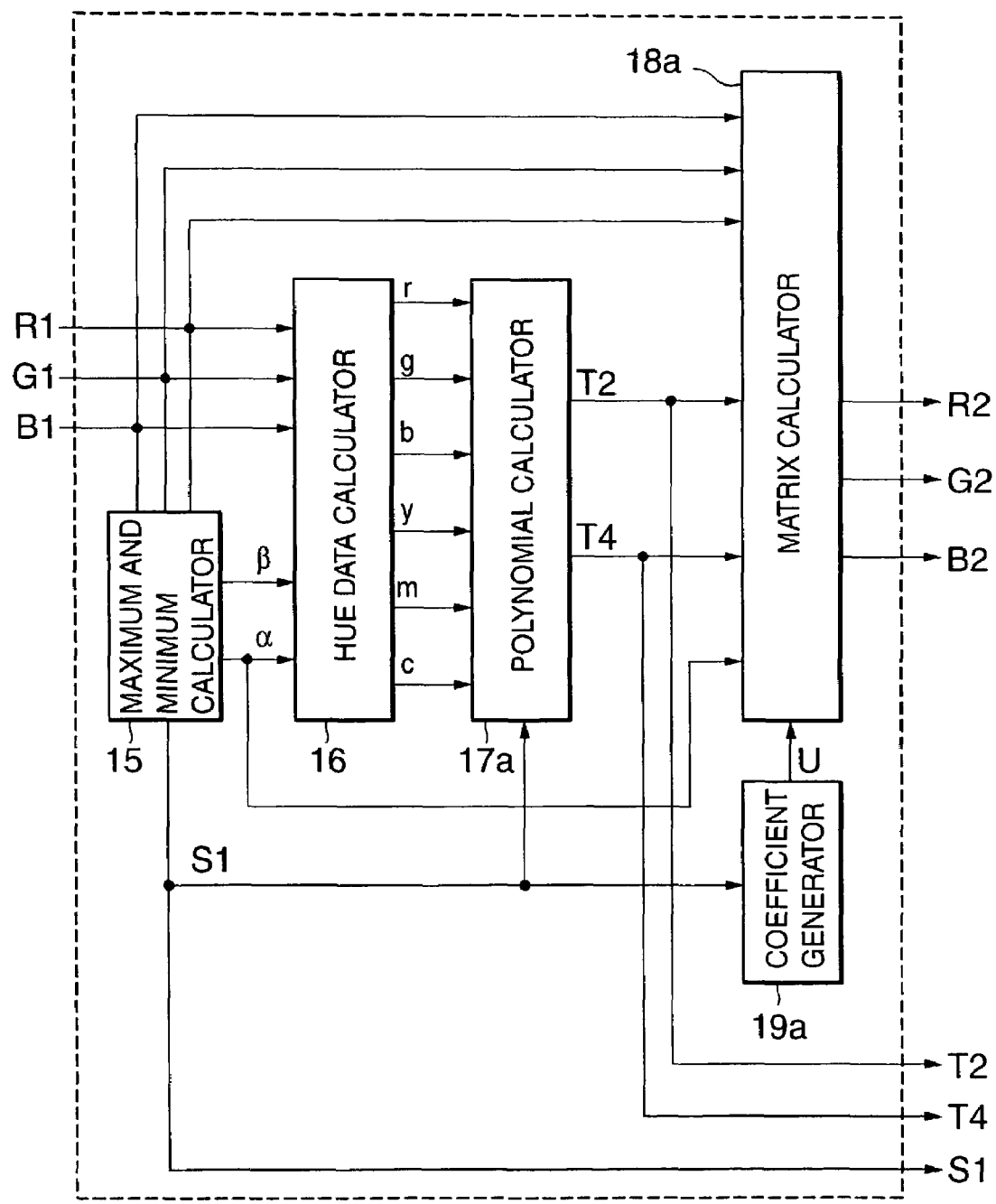
FIG. 18 is a block diagram showing the configuration of the color converter according to Embodiment 6.

FIG. 18 is a block diagram showing the configuration of the color converter 1b. It comprises a maximum and minimum calculator 15, a hue data calculator 16, a polynomial calculator 17a, a matrix calculator 18a, and a coefficient generator 19a. The configuration of the color converter 1b in the present embodiment will next be described.

The maximum and minimum calculator 15 produces the minimum value $\alpha$ and maximum value $\beta$ of the first color data R1, G1, B1. That is, $\beta$=max (R1, G1, B1), $\alpha$=min (R1, G1, B1). The maximum and minimum calculator 15 also produces an identification code S1 which indicates one of the six inter-hue zones, magenta to red, red to yellow, yellow to green, green to cyan, cyan to blue, and blue to magenta, in which the color represented by the first color data R1, G1, B1 falls. The minimum value $\alpha$ and the maximum value $\beta$ can be obtained, for example, by means of magnitude comparison circuits and selectors. The relationship between the inter-hue zone specified by the identification code S1, and the minimum value $\alpha$ and the maximum value $\beta$ is as shown in the following Table 1.

TABLE 1

| INTER-HUE ZONE | ID CODE S1 | MAXIMUM VALUE $\beta$ | MINIMUM VALUE $\alpha$ |
|---|---|---|---|
| MAGENTA-RED | 0 | Ri | Gi |
| RED-YELLOW | 1 | Ri | Bi |
| GREEN-CYAN | 2 | Gi | Ri |
| YELLOW-GREEN | 3 | Gi | Bi |
| CYAN-BLUE | 4 | Bi | Ri |
| BLUE-MAGENTA | 5 | Bi | Gi |

As shown in Table 1, when for instance R1 is the maximum value $\beta$, and G1 is the minimum value $\alpha$, among the first color data R1, G1, B1, R1, the color data R1, G1, B1 represents a color in the inter-hue zone magenta to red. The maximum and minimum calculator 15 outputs an identification code S1 having a value "0" which corresponds to the input color data.

The hue data calculator 2 calculates six hue data r, g, b, y, m, c based on the first color data R1, G1, B1, and the minimum value $\alpha$, and the maximum value $\beta$ output from the maximum and minimum calculator 15. The hue data are calculated in accordance with:

r=R1-$\alpha$,
g=G1-$\alpha$,
b=B1-$\alpha$,
y=$\beta$-B1,
m=$\beta$-G1,
c=$\beta$-R1.

Figure 19:
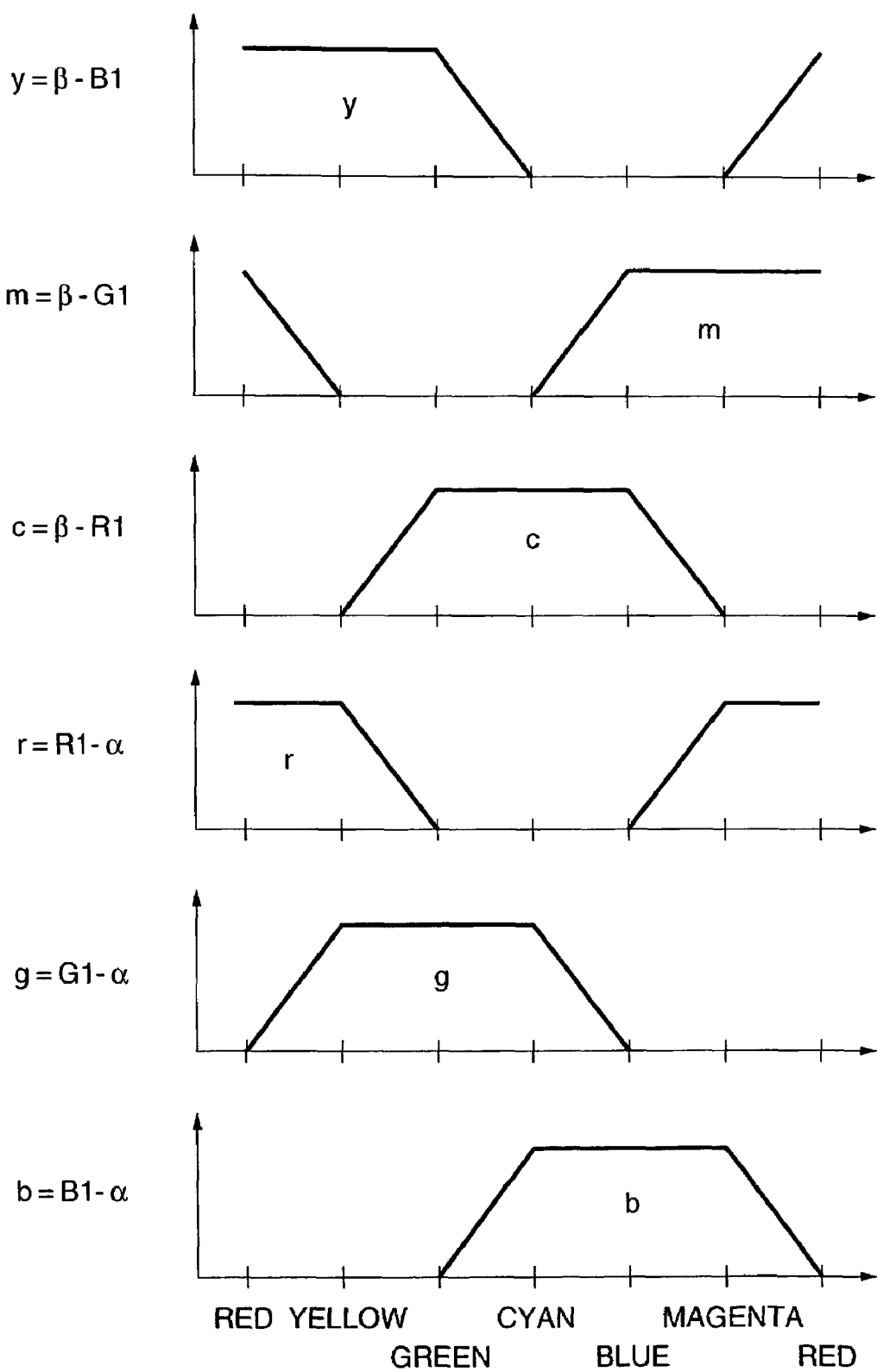
FIG. 19 schematically illustrates the hue data.

FIG. 19 schematically illustrates the relationship between six hues of red, green, blue, yellow, cyan, magenta and the data r, g, b, y, m, c.

Based on the hue data r, g, b, y, m, c calculated by the hue data calculator 16, the polynomial calculator 17a calculates polynomial data T2, T4, which are used in the matrix calculation for the color conversion.

Figure 20:
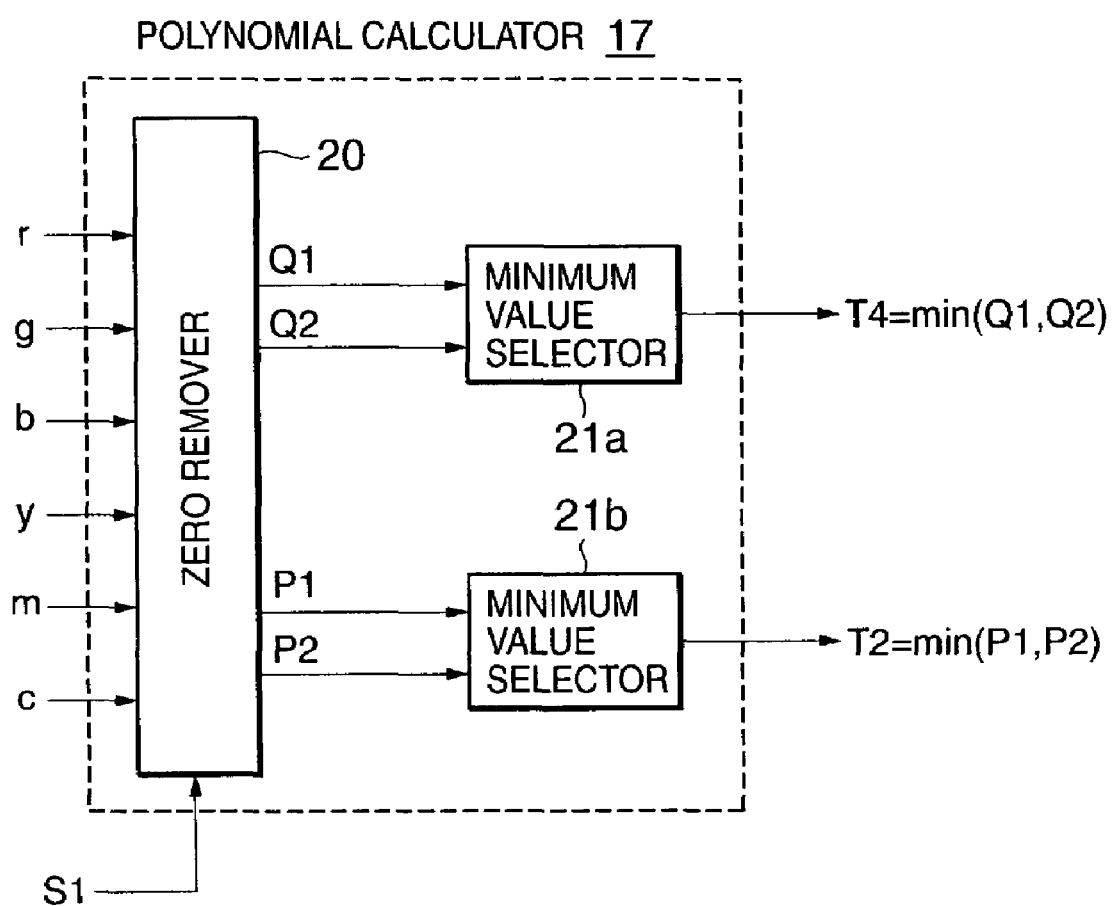
FIG. 20 is a block diagram showing the configuration of the polynomial calculator.

FIG. 20 shows the internal configuration of the polynomial calculator 17a. The hue data r, g, b, y, m, c are input to a zero remover 20. There is a characteristics that one of the hue data r, g, b is zero, and one of the hue data y, m, c is zero. The zero remover 20 outputs two of the hue data r, g, b which are not zero, as Q1, Q2, and outputs two of the hue data y, m, c which are not zero, as P1, P2. The following Table 2 shows the relationship between the identification code S1 and the P1, P2, Q1, Q2, and the hue data which are zero.

TABLE 2

| ID CODE S1 | Q1 | Q2 | P1 | P2 | HUE DATA THAT ARE ZERO |
|---|---|---|---|---|---|
| 0 | r | b | m | y | g, c |
| 1 | r | g | y | m | b, c |
| 2 | g | b | c | y | r, m |
| 3 | g | r | y | c | b, m |
| 4 | b | g | c | m | r, y |
| 5 | b | r | m | c | g, y |

As shown in Table 2, when for instance the color represented by the first color data R1, G1, B1 falls in the inter-hue zone magenta to red, the value of the identification code S1 will be zero, and the hue data g, c are zero.

A minimum value selector 21a outputs the smaller one of Q1, Q2, as the polynomial data T4, while a minimum value selector 21b outputs the smaller one of P1, P2, as the polynomial data T2. Accordingly, the polynomial data can be represented by T2=min (P1, P2), T4=min (Q1, Q2). That is, the polynomial data T4 is produced based on the two of the hue data y, m, c which are not zero, while the polynomial data T2 is produced based on the two of the hue data r, g, b which are not zero.

The thus-generated polynomial data T4 forms a calculation term which is effective for red, green, or blue, and the thus-generated polynomial data T2 forms a calculation term which is effective for yellow, cyan, or magenta. The polynomial data T4 forming a calculation term which is effective for red, green or blue is also denoted by h1$r$, h1$g$, or h1$b$. Similarly, the polynomial data T2 forming a calculation term which is effective for yellow, magenta or cyan is also denoted by h1$y$, h1$m$, or h1$c$. Then, each of the calculation terms is given by the following formula (14).

For T4

$h1r = \min(y, m)$ $h1g = \min(c, y)$ $h1b = \min(c, m)$

For T2

$h1c = \min(b, g)$ $h1m = \min(r, b)$ $h1y = \min(r, g)$ \hfill (14)

FIG. 21 schematically illustrates the relationship between the respective calculation terms h1$r$, h1$g$, h1$b$, h1$y$, h1$m$, h1$c$ formed of the polynomial data T4, T2, and the respective hues red, green, blue, yellow, magenta, cyan. As shown in FIG. 21, the calculation terms h1$r$, h1$g$, h1$b$ formed of the polynomial data T4 respectively relate to the hues red, green, or blue, and the calculation terms h1y, h1m, h1c formed of the polynomial data T2 respectively relate to the hues yellow, magenta, cyan.

There are six combinations of hues for which the polynomial data T4 (h1r, h1g, h1b) and the polynomial data T2 (h1y, h1c, h1m) are effective, in correspondence with the value of the identification code S1. Table 3 shows the relationship between the value of the identification code S1 and the calculation terms which are effective among those formed of the polynomial data T4, T2.

TABLE 3

| ID CODE S1 | T4 | T2 |
|---|---|---|
| 0 | h1r | h1m |
| 1 | h1r | h1y |
| 2 | h1g | h1c |
| 3 | h1g | h1y |
| 4 | h1b | h1c |
| 5 | h1b | h1m |

Figure 22:
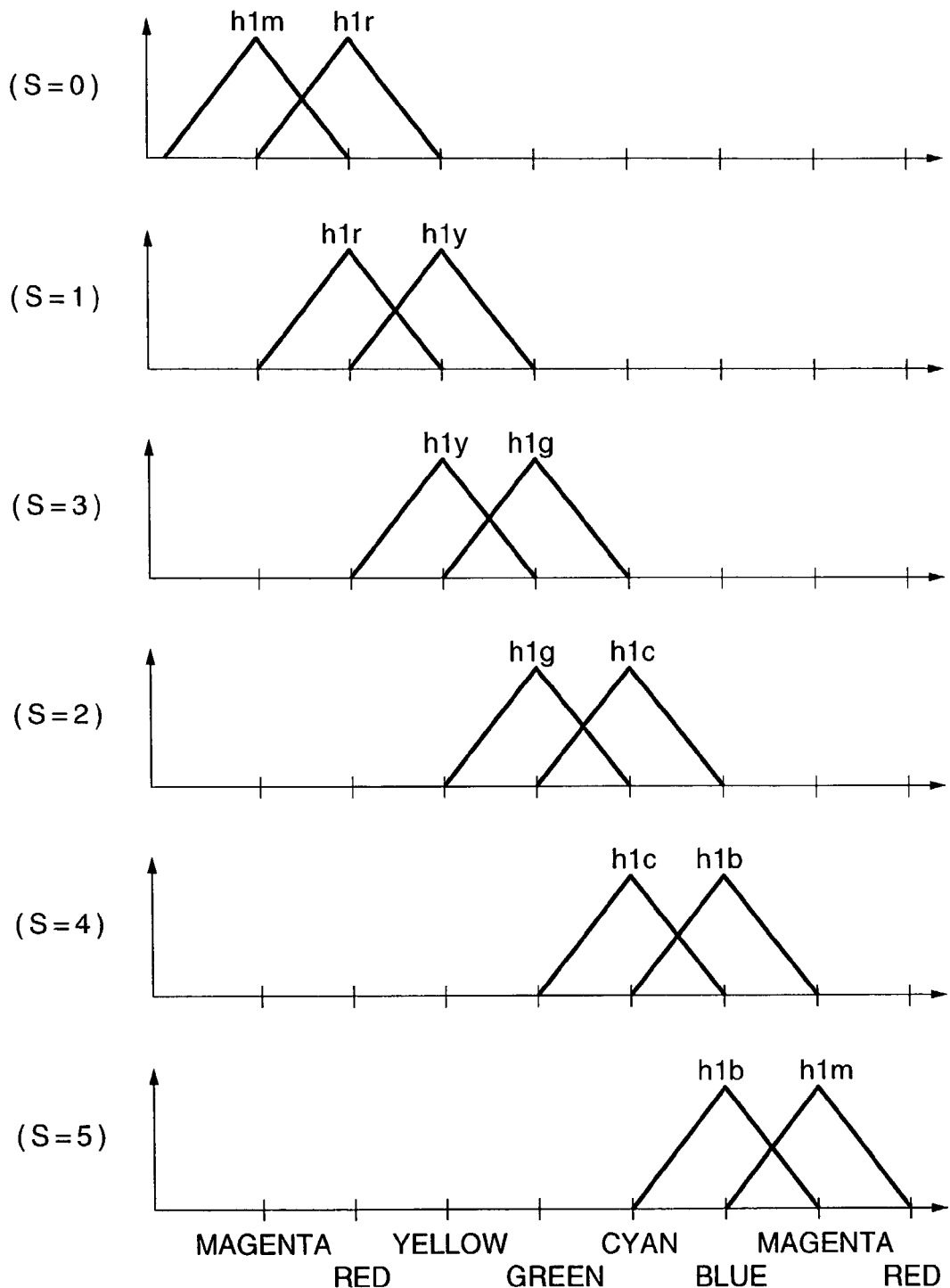
FIG. 22 schematically illustrates the relationship between the polynomial data and the hues.

As shown in Table 3, when for instance, the identification code S1 is "0," i.e., when the color represented by the first color data R1, G1, B1 falls in the inter-hue zone magenta to red, the calculation terms h1m, h1r which are effective for magenta and red are generated as the polynomial data T2, T4. FIG. 22 schematically illustrates the relationship between the hue for which the polynomial data T2, T4 are effective, and the value of the identification code S1.

The polynomial data T2, T4, as well as the first color data R1, G1, B1, and minimum value $\alpha$ are input to the matrix calculator 18a. Based on the value of the identification code S1, the coefficient generator 19a generates coefficients U corresponding to the matrix coefficients (Fij (i=1 to 3, j=1 to 3) for the polynomial data T2, T4, and the minimum value $\alpha$ representing the achromatic component. The matrix calculator 18a uses the matrix coefficients Fij (U) to perform the matrix calculation in accordance with the following formula (15), to produce the second color data R2, G2, B2.

$$\begin{bmatrix} R2 \\ G2 \\ B2 \end{bmatrix} = \begin{bmatrix} R1 \\ G1 \\ B1 \end{bmatrix} + (Fij) \begin{bmatrix} T2 \\ T4 \\ \alpha \end{bmatrix} (i = 1 \text{ to } 3, \ j = 1 \text{ to } 3) \quad (15)$$

If the polynomial data T4 is substituted by the calculation terms h1r, h1g, h1b, and the polynomial data T2 is substituted by the calculation terms h1y, h1c, h1m, the above formula (15) can be rewritten as follows. Here, for Fij, i=1 to 7, j=1 to 3.

$$\begin{bmatrix} R2 \\ G2 \\ B2 \end{bmatrix} = \begin{bmatrix} R1 \\ G1 \\ B1 \end{bmatrix} + (Fij) \begin{bmatrix} h1r \\ h1g \\ h1b \\ h1c \\ h1m \\ h1y \\ \alpha \end{bmatrix} (i = 1 \text{ to } 7, \ j = 1 \text{ to } 3) \quad (16)$$

Figure 23:
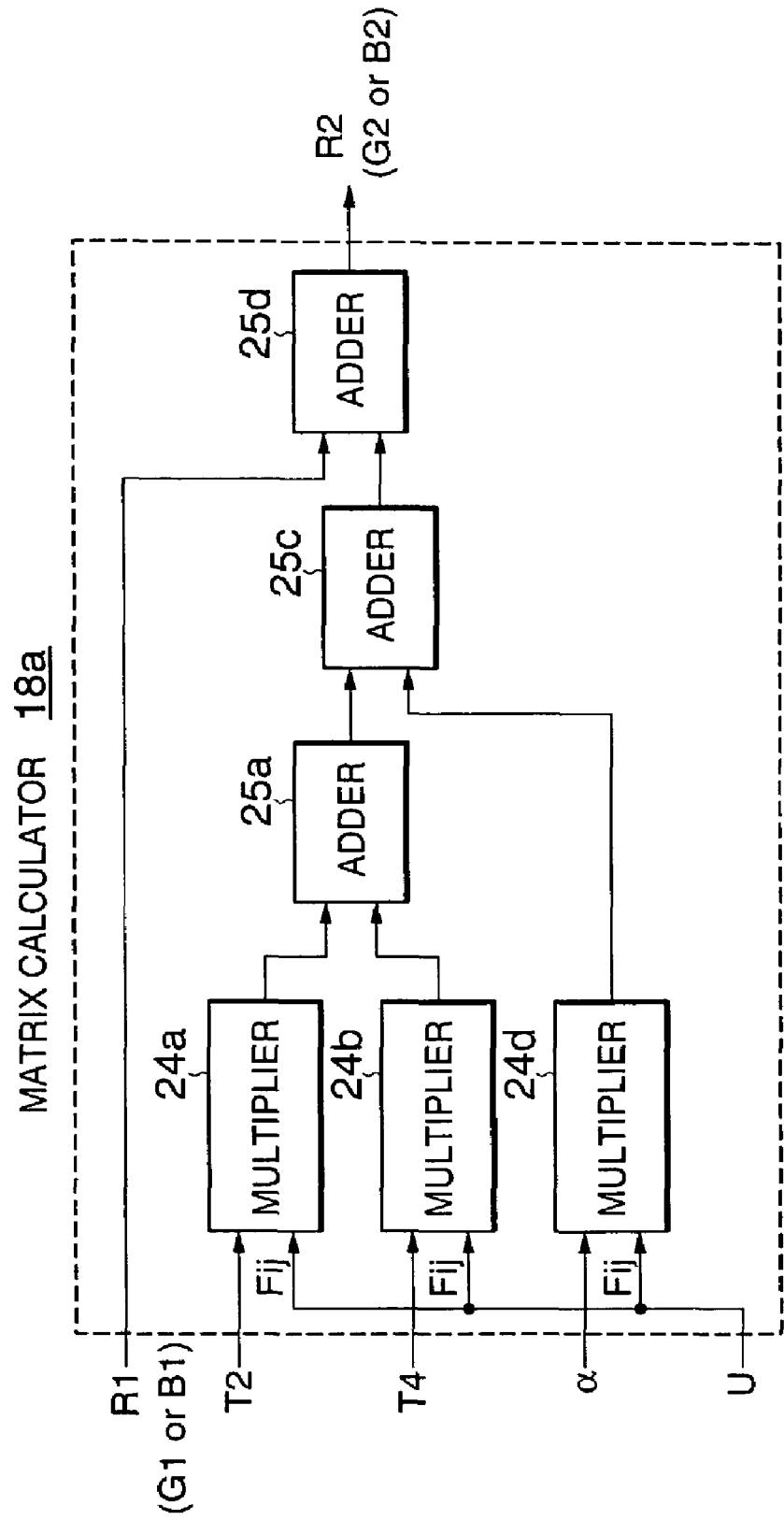
FIG. 23 is a block diagram showing the configuration of the matrix calculator.

FIG. 23 is a block diagram showing the configuration of the matrix calculator 18a. Multipliers 24a to 24c respectively multiply the polynomial data T2, T4, and minimum value $\alpha$, with corresponding matrix coefficients Fij. An adder 25a adds the outputs of the multipliers 24a and 24b. An adder 25c adds the output of the adder 25a, and the output of the multiplier 24c. An adder 25d adds the output of the adder 25c to the first color data R1, and outputs the sum as the second color data R2. If, in FIG. 23, the first color data G1, B1 is input to the adder 25d in place of R1, second color data G2 or B2 is calculated.

As shown in the formula (15), (16), the color converter 1b according to the present embodiment performs color conversion by means of matrix calculation using, as the calculation terms, the polynomial data T2 (h1c, h1m, h1y), T4 (h1r, h1g, h1b) which are effective for one of the hues red, yellow, green, cyan, blue, and magenta, so that it is possible to control each of the six hue components independently.

The operation of the color converter 1b according to the present embodiment will next be described with reference to a specific example. The color converter 1b is assumed to perform color conversion in accordance with the following matrix calculation formula (17).

$$\begin{bmatrix} R2 \\ G2 \\ B2 \end{bmatrix} = \begin{bmatrix} R1 \\ G1 \\ B1 \end{bmatrix} + \begin{bmatrix} 0.2 & 0 & 0 & 0.05 & 0 & 0.2 & 0 \\ 0.1 & 0.3 & 0 & 0.1 & 0 & 0.25 & 0 \\ 0 & 0.1 & 0 & 0.15 & 0.05 & 0 & 0 \end{bmatrix} \begin{bmatrix} h1r \\ h1g \\ h1b \\ h1c \\ h1m \\ h1y \\ \alpha \end{bmatrix} \quad (17)$$

When color conversion is performed in accordance with the above matrix calculation formula (17) on the first color data R1, G1, B1 representing the maximum of each of the hues of red, green, blue, cyan, yellow, and magenta, the second color data R2, G2, B2 will be as shown in Table 4.

TABLE 4

| | FIRST COLOR DATA | | | SECOND COLOR DATA | | |
|---|---|---|---|---|---|---|
| HUE | R1 | G1 | B1 | R2 | G2 | B2 |
| RED | 255 | 0 | 0 | 306 | 25 | 0 |
| GREEN | 0 | 255 | 0 | 0 | 331 | 25 |
| BLUE | 0 | 0 | 255 | 0 | 0 | 255 |
| CYAN | 0 | 255 | 255 | 12 | 280 | 293 |
| MAGENTA | 255 | 0 | 255 | 255 | 0 | 267 |
| YELLOW | 255 | 255 | 0 | 306 | 318 | 0 |

As shown in Table 4, when color conversion is performed in accordance with the above matrix calculation formula (17), if the hue of the first color data varies, the maximum value which the second color data can assume also varies. For instance, when the first color data represents the maximum of red (R1=255, G1=0, B1=0), the second color data will be R2=306, G2=25, B2=0, and the maximum value will be 306. When the first color data represents the maximum of green (R1=0, G1=255, B1=0), the second color data will have values: R2=0, G2=331, B2=25, and the maximum value will be 331.

For this reason, if an identical color data multiplication coefficient k (and/or complementary color data multiplication coefficient h) is used for all the hues in the color gamut compression, it may be suitable for a color data of a certain hue, but it may not be suitable for a color data of another hue, and color contraction may not be eliminated. In the color data compressor 3e according to the present embodiment, the characteristics of the color data multiplication coefficient used for the color gamut compression is adjusted for each hue of the color data, so as to effectively avoid color contraction.

Figure 24:
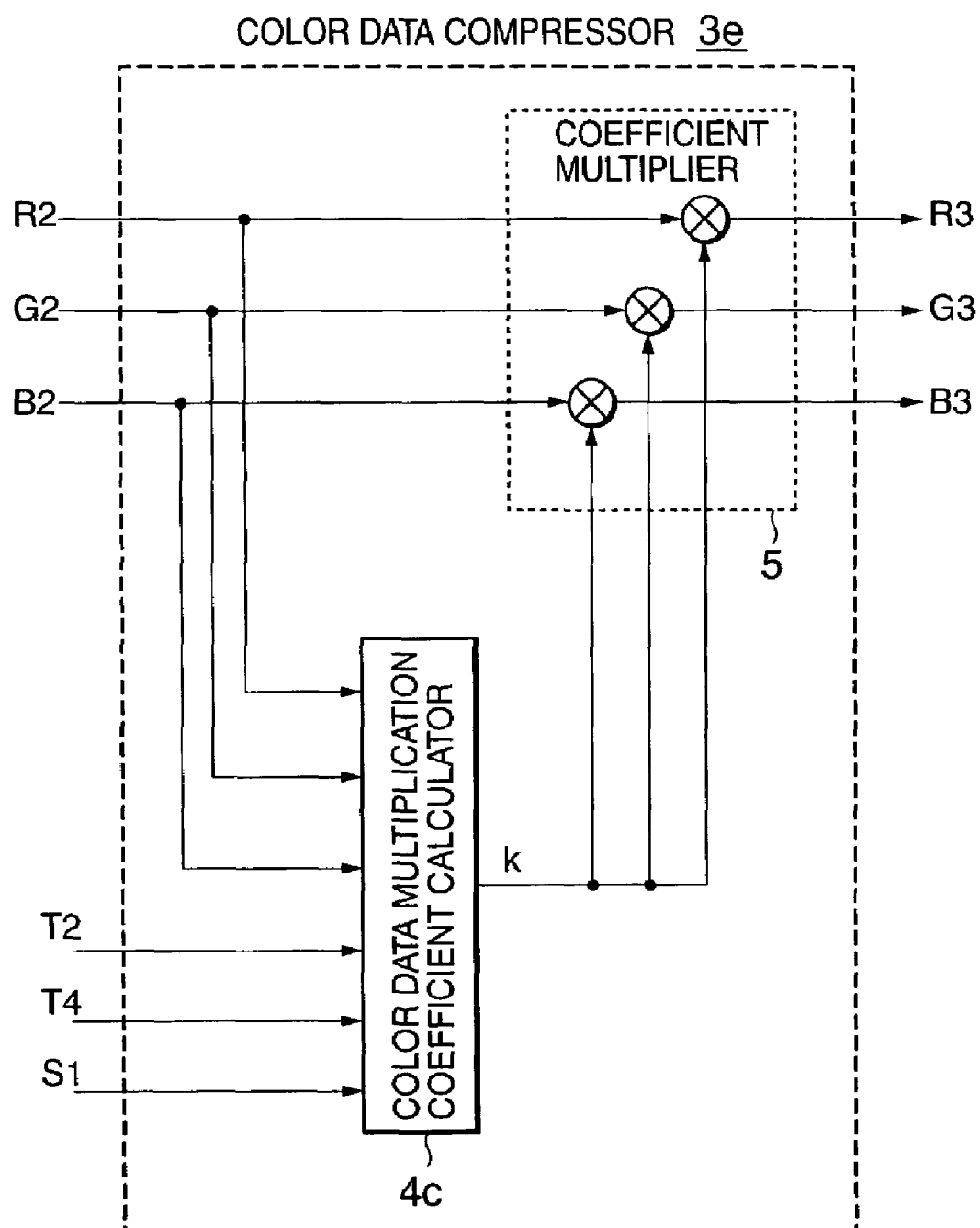
FIG. 24 is a block diagram showing the configuration of the color data compressor.

FIG. 24 is a block diagram showing the configuration of the color data compressor 3e. A color data multiplication coefficient calculator 4c outputs the color data multiplication coefficient k based on the maximum value of the second color data R2, G2, B2, the polynomial data T2, T4, and the identification code S1. A coefficient multiplier 5 multiplies the second color data R2, G2, B2 with the color data multiplication coefficient k, to produce third color data R3, G3, B3.

Figure 25:
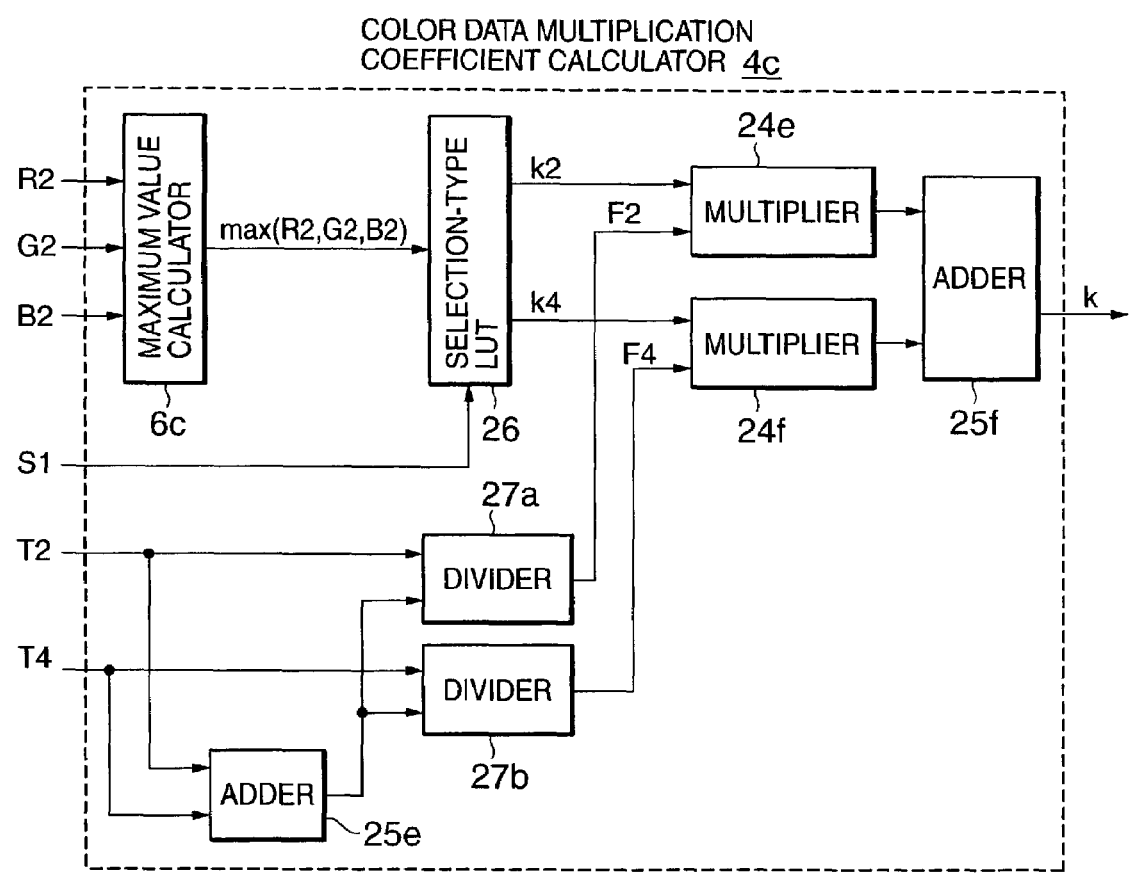
FIG. 25 is a block diagram showing the configuration of the color data multiplication coefficient calculator.

FIG. 25 is a block diagram showing the configuration of the color data multiplication coefficient calculator 4c. A maximum value calculator 6c outputs the maximum value, represented by "max (R2, G2, B2)," of the second color data R2, G2, B2. A selection-type look-up table (LUT) 26 outputs the coefficient data k2, k4 based on the maximum value of the second color data R2, G2, B2, and the identification code S1.

Figure 26:
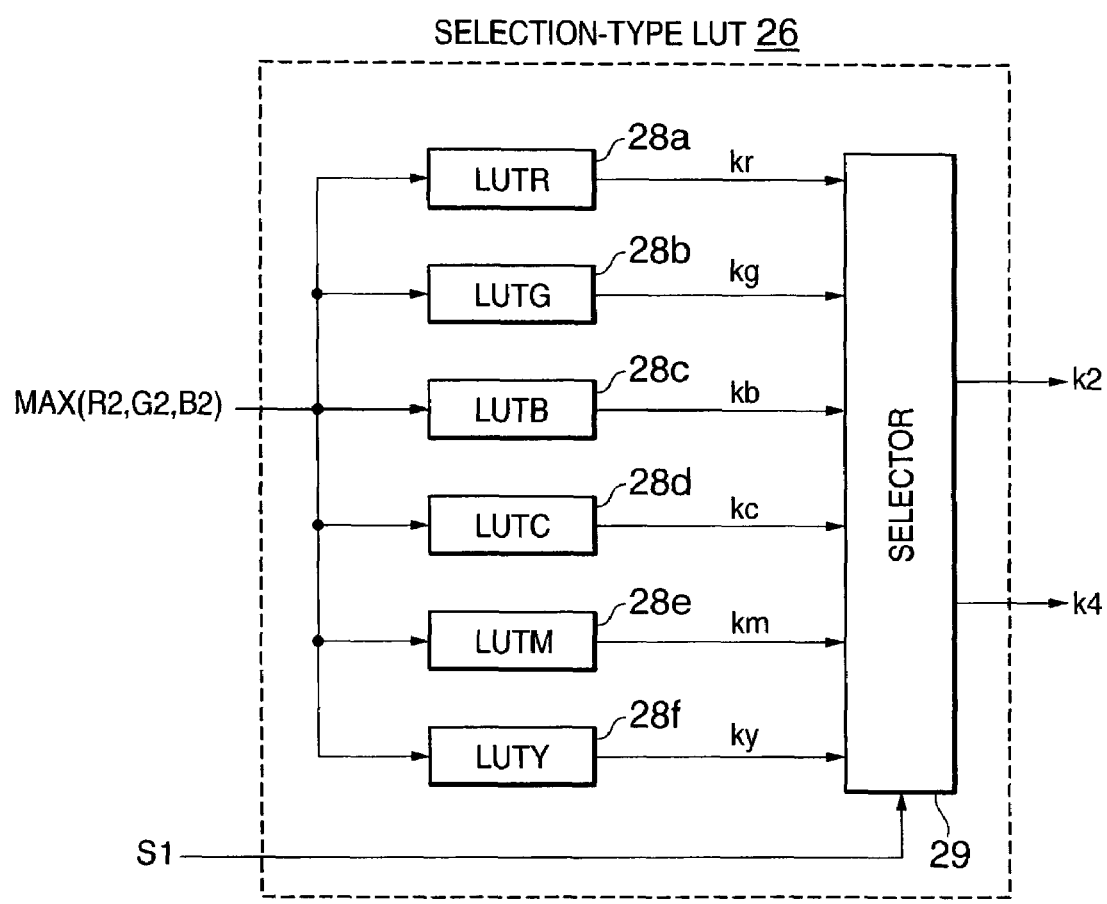
FIG. 26 is a block diagram showing the configuration of the selection-type look-up table.

FIG. 26 is a block diagram showing the configuration of the selection-type look-up table 26. As shown in FIG. 26, the selection-type look-up table 26 includes a red look-up table 28a, green look-up table 28b, blue look-up table 28c, cyan look-up table 28d, magenta look-up table 28e, yellow look-up table 28f, and a selector 29. Each of the look-up tables 28a to 28f stores a color data multiplication coefficient having a characteristics corresponding to each of the hues of red, green, blue, cyan, magenta, and yellow. The characteristics for each of the six hues mentioned above is similar to that of the LUT 28 described in connection with Embodiments 1 to 5. The characteristics of the color data multiplication coefficient for each hue is determined in correspondence with the range of values the second color data can assume when the first color data represents each of the hues red, green, blue, cyan, magenta, and yellow.

The maximum value max (R2, G2, B2) of the second color data R2, G2, B2 is input as a read address to the red look-up table 28a, green look-up table 28b, blue look-up table 28c, cyan look-up table 28d, magenta look-up table 28e, and yellow look-up table 28. Each look-up table outputs the color data multiplication coefficient corresponding to the maximum value max (R2, G2, B2) of R2, G2, B2, as the coefficient data kr, kg, kb, kc, km, ky.

Based on the identification code S1, the selector 29 outputs, as k2, k4, the coefficient data corresponding to the hue represented by the first color data R1, G1, B1, among the six coefficient data kr, kg, kb, kc, km, ky output from the look-up tables 28a to 28f. The following Table 5 shows the relationship between the value of the identification code S1 and the coefficient data k2 and k4.

TABLE 5

| INTER-HUE ZONE | ID CODE S1 | T4 | T2 | k4 | k2 |
|---|---|---|---|---|---|
| MAGENTA-RED | 0 | h1r | h1m | kr | km |
| RED-YELLOW | 1 | h1r | h1y | kr | ky |
| GREEN-CYAN | 2 | h1g | h1c | kg | kc |
| YELLOW-GREEN | 3 | h1g | h1y | kg | ky |
| CYAN-BLUE | 4 | h1b | h1c | kb | kc |
| BLUE-MAGENTA | 5 | h1b | h1m | kb | km |

As shown in Table 5, for the identification code S1=0 for instance, the color represented by the first color data R1, G1, B1 falls in the inter-hue zone of magenta to red, so that the coefficient data kr, km corresponding thereto are selected.

Referring again to FIG. 25, the coefficient data k2, k4 output from the selection-type look-up table 26 are respectively input to multipliers 24e, 24f. An adder 25e determines the sum (T2+T4) of the polynomial data T2 and T4. A divider 27a divides the polynomial data T2 by the output of the adder 25e, and outputs the resultant quotient as a hue indication signal F2. A divider 27b divides the polynomial data T4 by the output of the adder 25e, and outputs the resultant quotient as another hue indication signal F4. The hue indication signals F2, F4 are therefore given by the following equations (18).

$$F2=T2/(T2+T4)$$

$$F4=T4/(T2+T4) \quad (18)$$

When the identification code S1=0,
$T4+T2=h1r+h1m=\min(y, m)+\min(b,r)$.

Here,
$y=\beta-B1$, and
$m=\beta-G1$.

The minimum value $\alpha$ of the first color data R1, G1, B1 is G1, so that
$\min(y, m)=y=\beta-B1$.

Moreover, since
$b=B1-\alpha$,
$r=R1-\alpha$, and the maximum value $\beta$ of R1, G1, B1 is R1,
$\min(b,r)=b=B1-\alpha$.

Accordingly, the polynomial data
$T4+T2=(\beta-G1)+(B1-\alpha)=\beta-\alpha$.

This relationship holds when the identification code S1 is also other than "0," and T2+T4 is always equal to $\beta-\alpha$ regardless of the value of the identification code S1. Accordingly, T2+T4 may be obtained by determining $\beta-\alpha$.

The ratio between the hue indication signals F2 and F4 represented by the above formula (18) corresponds to the ratio between the degrees of influence of the polynomial data T2, T4 in the color conversion, and the sum of the two values is always "1." The values of the hue indication signals F2 and F4 indicate the hue of the color represented by the first color data R1, G1, B1, within the inter-hue zone of magenta to red, red to yellow, yellow to green, green to cyan, cyan to blue, or blue to magenta that is identified by the identification code S1. Further description will be made with reference to a specific example.

For instance, when the first color data has values R1=80, G1=16, B1=48, the maximum value $\beta$ and the minimum value $\alpha$ will be given as: $\beta=R1=80$, $\alpha=G1=16$, so that it will be seen from Table 1 that the corresponding identification code S1 is "0." Accordingly, the above first color data represents a color in the inter-hue zone magenta to red. The ratio between the R, G, B components representing the hue information is 5:1:3. Then, the hue data are as follows:
$r=R1-\alpha=64$,
$g=G1-\alpha=0$,
$b=B1-\alpha=32$,
$c=\beta-R1=0$,
$m=\beta-G1=64$,
$y=\beta-B1=32$.

The polynomial data T2, T4 are as follows:
$T4=h1r=\min(y, m)=32$,
$T2=h1m=\min(b, r)=32$.

Accordingly, in accordance with the formula (18), the hue indication signals will be as follows:
F2=0.5,
F4=0.5.

When the first color data has values R1=160, G1=32, B1=96, the ratio between the R, G, B components representing the hue information is 5:1:3, and the first color data of this example represents the same hue as the previous example, but represents a different lightness. The maximum value β=160, and minimum value α=32, so that the respective hue data are given below:
r=Ri−α=128,
g=Gi−α=0,
b=Bi−α=64,
c=β−Ri=0,
m=β−Gi=128,
y=β−Bi=64.

Accordingly, the polynomial data T2, T4 are given as follows:
T4=h1r=min (y,m)=64,
T2=h1m=min (b,r)=64.

The hue indication signals F2, F4 will be F2=0.5, F4=0.5, as in the previous example.

Thus, the hue indication signal F2 and F4 will be of the same value for the color data of the same hue, regardless of the magnitude of the lightness. In the above example, the identification code S1=0, and F2=F4=0.5, so that the hue indication signals F2, F4 indicate that the first color data represents a hue in the middle of the inter-hue zone magenta to red, and the degrees of the influence of the polynomial data T2, T4 in the color conversion are equal.

Referring again to FIG. 25, the multiplier 24e multiplies the coefficient data k2 with the hue indication signal F2, and the multiplier 24f multiplies the coefficient data k4 with the hue indication signal F4. An adder 25f adds the outputs of the multipliers 24e, 24f, and outputs the sum as the color data multiplication coefficient k. That is, the color data multiplication coefficient k is given by the following formula (19).

$$k=k2\times F2+k4\times F4 \tag{19}$$

As shown by the above formula (19), the color data multiplication coefficient k is calculated by adding the coefficient data km and kr; kr and ky; ky and kg; kg and kc; kc and kb; or kb and km, which are output in correspondence with the hue of the first color data, in a ratio between the hue components of magenta and red, red and yellow, yellow and green, green and cyan, cyan and blue, or blue and magenta, in the first color data.

As has been described, the color data compressor 3e according to the present embodiment generates the color data multiplication coefficient corresponding to the hue of the first color data, based on the color data multiplication coefficients corresponding to the respective hues of red, green, blue, cyan, yellow, and magenta, so that it is possible to perform color gamut compression in a more appropriate way, and to thereby prevent color contraction more effectively.

Incidentally, the color gamut compressing section 2 may be of the configuration shown in connection with Embodiment 3, 4, 5, and yet similar results can be obtained.

Embodiment 7.

Figure 27:
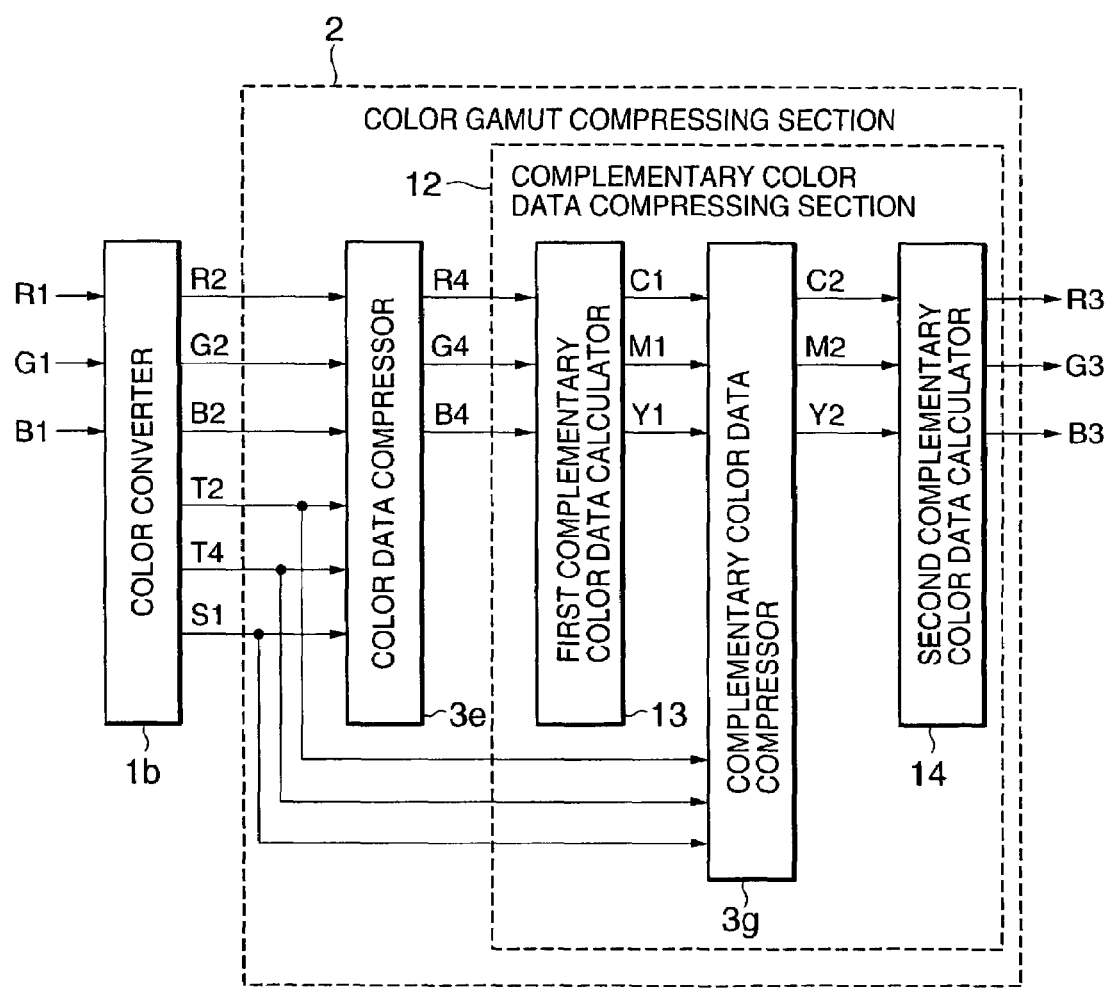
FIG. 27 is a block diagram showing the configuration of the color conversion apparatus according to Embodiment 7.

FIG. 27 is a block diagram showing the configuration of the color conversion apparatus. As shown in FIG. 27, the color conversion apparatus according to the present embodiment includes a color converter 1b, and a color gamut compressing section 2, which in turn includes a color data compressor 3e, and a complementary color data compressing section 12, which in turn includes a first complementary color data calculator 13, a complementary color data compressor 3g, and a second complementary color data calculator 14. The color converter 1b, and the color data compressor 3e have the same configurations as those in Embodiment 6. The complementary color data compressor 3g has the same configuration as the color data compressor 3e of Embodiment 6, shown in FIGS. 24 to 26.

As in Embodiment 6, the color data compressor 3e applies color gamut compression corresponding to the hue of the first color data R1, G1, B1, based on the polynomial data T2, T4, and the identification code S1, to the second color data, to produce the compressed color data R4, G4, B4. The first complementary color data calculator 13 outputs the complementary color data C1, M1, G1 of the compressed color data. As in Embodiment 6, the complementary color data compressor 3g applies color gamut compression corresponding to the hue of the first color data R1, G1, B1, to the complementary color data C1, M1, G1, based on the polynomial data T2, T4, and the identification code S1, to produce the compressed complementary color data C2, M2, Y2. The second complementary color data calculator 14 calculates the complements of the compressed complementary color data C2, M2, Y2, to produce the third color data R3, G3, B3.

According to the present embodiment, the complementary color data of the compressed color data is further subjected to color gamut compression corresponding to the hue of the first color data, so that even if the maximum value of the second color data varies with the hue of the first color data, it is possible to avoid color contraction which may otherwise occur in association with the color conversion that increases the lightness and saturation.

Embodiment 8.

Figure 28:
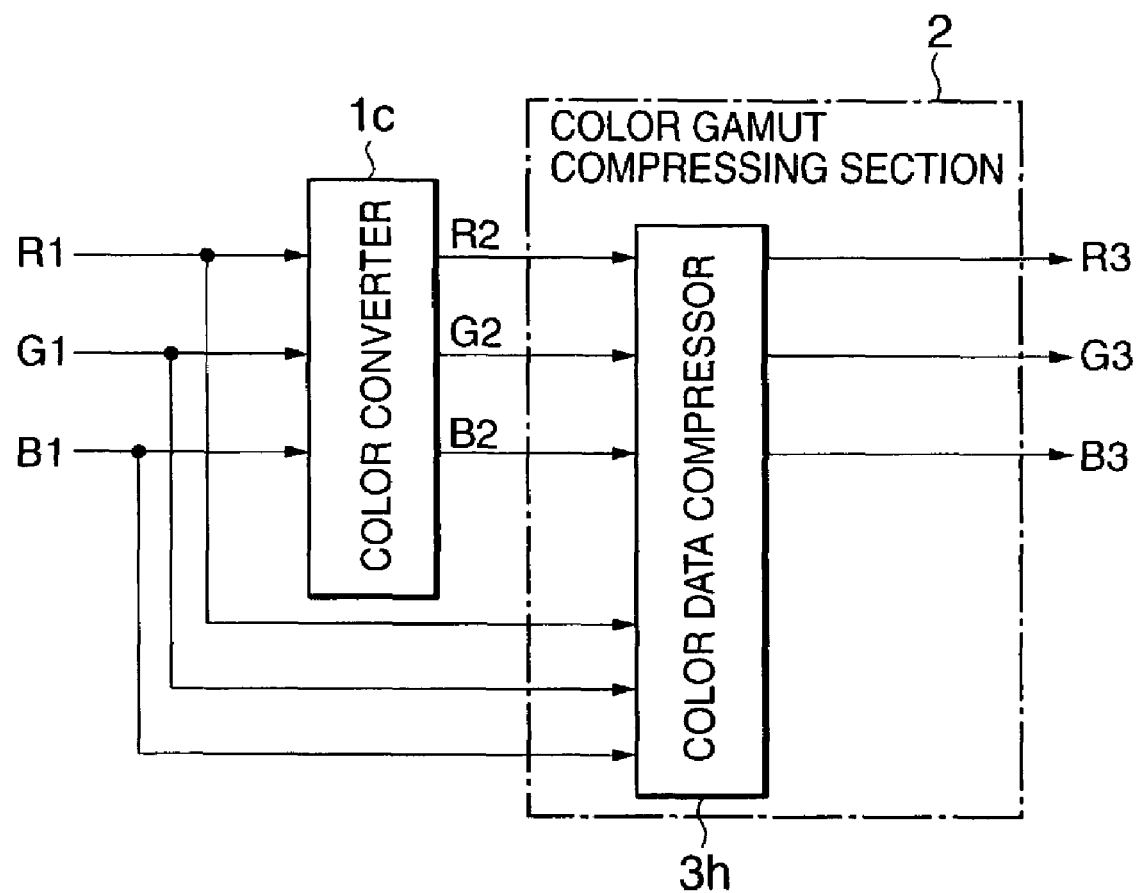
FIG. 28 is a block diagram showing the configuration of the color conversion apparatus according to Embodiment 8.

FIG. 28 is a block diagram showing another configuration of a color conversion apparatus. A color converter 1c performs color conversion represented by the following matrix calculation formula (20) to produce second color data R2, G2, B2.

$$\begin{bmatrix} R2 \\ G2 \\ B2 \end{bmatrix} = \begin{bmatrix} 1.2 & 0.1 & 0.2 \\ 0.15 & 1.3 & 0.2 \\ 0 & 0.2 & 1.0 \end{bmatrix} \begin{bmatrix} R1 \\ G1 \\ B1 \end{bmatrix} \tag{20}$$

When the color conversion in accordance with the above formula (20) is performed on the first color data R1, G1, B1, representing the maximum values of the hues of the red, green, blue, cyan, yellow, and magenta, the values of the second color data R2, G2, B2 will be as shown in Table 6.

TABLE 6

| HUE | FIRST COLOR DATA | | | SECOND COLOR DATA | | |
|---|---|---|---|---|---|---|
| | R1 | G1 | B1 | R2 | G2 | B2 |
| RED | 255 | 0 | 0 | 306 | 38 | 0 |
| GREEN | 0 | 255 | 0 | 25 | 331 | 51 |
| BLUE | 0 | 0 | 255 | 51 | 51 | 255 |
| CYAN | 0 | 255 | 255 | 76 | 382 | 306 |
| MAGENTA | 255 | 0 | 255 | 357 | 89 | 255 |
| YELLOW | 255 | 255 | 0 | 331 | 369 | 51 |

As shown in Table 6, when the color conversion is performed in accordance with the above matrix calculation formula (20), if the hue of the first color data varies, the maximum value which the second color data can assume also varies. For instance, when the first color data represents the maximum value of red, (R1=255, G1=0, B1=0), the second color data will have values R2=306, G2=38, B2=0, and the maximum value is 306. When the first color data represents the maximum value of green, (R1=0, G1=255, B1=0), the second color data will have values R2=25, G2=331, B2=51, and the maximum value will be 331.

For this reason, if a color data multiplication coefficient of an identical characteristics is used in the color gamut compression, it may be suitable for color data of a certain hue, but may not be suitable for color data of another hue, with the result that color contraction may still occur. As a countermeasure, a color data compressor 3h, like Embodiment 6, applies color gamut compression corresponding to the hue of the first color data R1, G1, B1, to produce the third color data R3, G3, B3.

Figure 29:
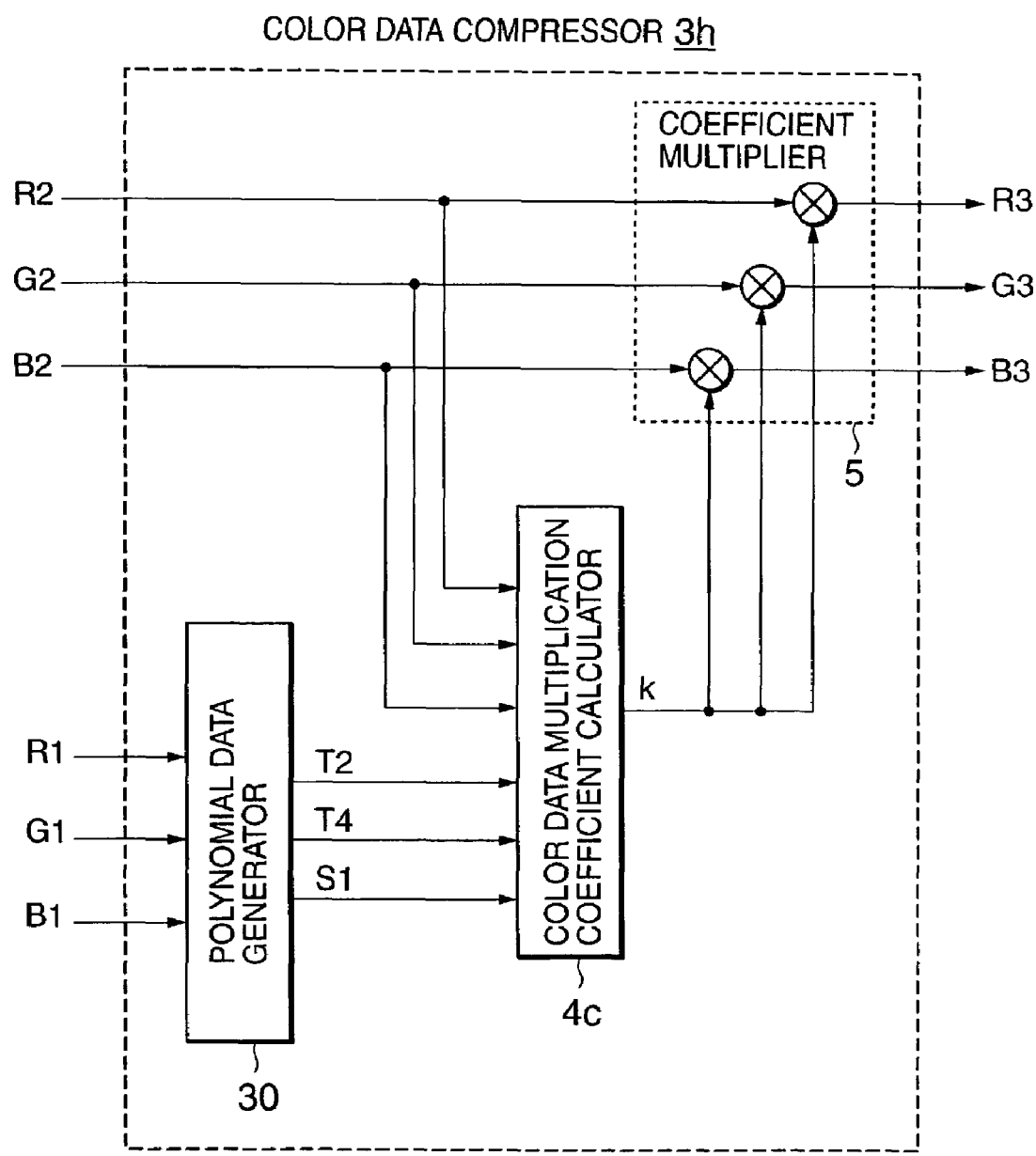
FIG. 29 is a block diagram showing the configuration of the color data compressor.

FIG. 29 is a block diagram showing a configuration of the color data compressor 3h. A polynomial data generator 30 generates the polynomial data T2, T4, and the identification code S1 based on the first color data R1, G1, B1, and outputs them to a color data multiplication coefficient calculator 4c.

Figure 30:
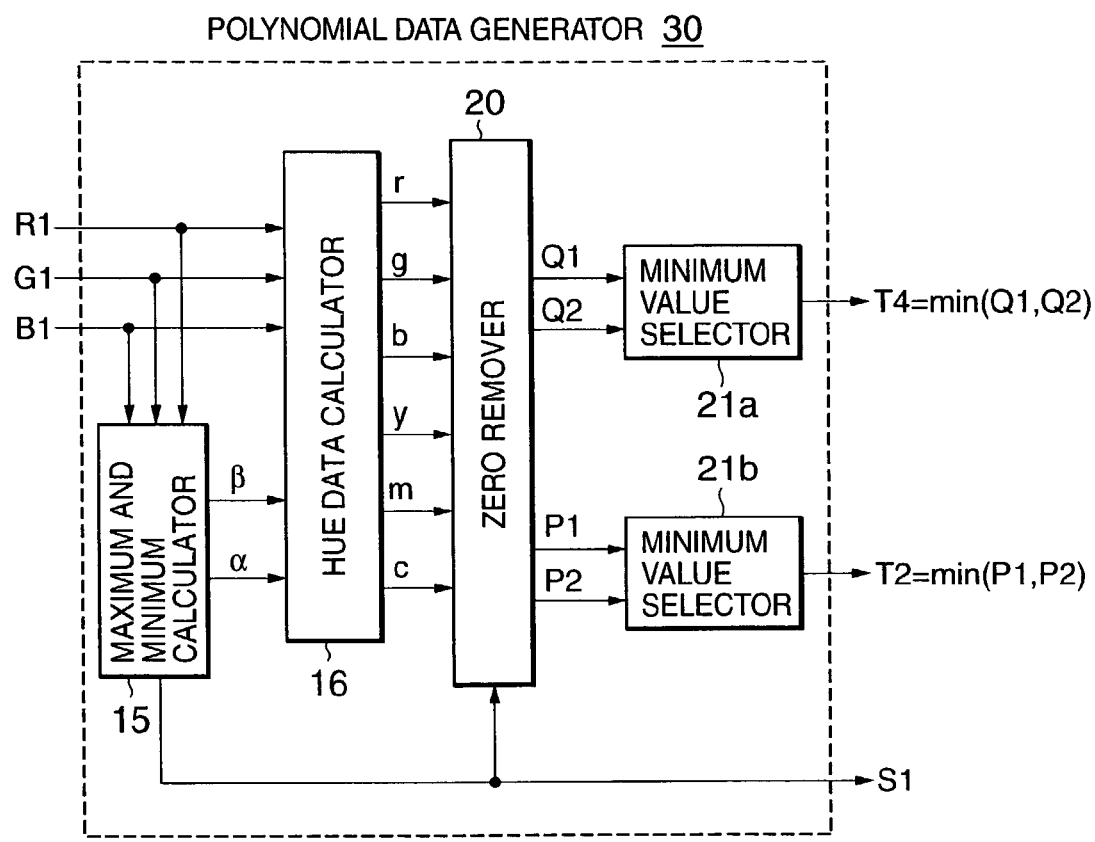
FIG. 30 is a block diagram showing the configuration of the polynomial data generator.

FIG. 30 is a block diagram showing the configuration of the polynomial data generator 30. As shown in FIG. 30, the polynomial data generator 30 includes a maximum and minimum calculator 15, a hue data calculator 16, a zero remover 20, and minimum value selectors 21a, 21b.

The maximum and minimum calculator 15 outputs the maximum value β and the minimum value α of the first color data R1, G1, B1, and outputs an identification code S1 specifying the inter-hue zone to which the color represented by the first color data R1, G1, B1 belongs, based on the maximum value β, and the minimum value α. The relationship between the value of the identification code S1, and the minimum value α and the maximum value β is as shown in the above Table 1.

The hue data calculator 16 generates six hue data r, g, b, y, m, c based on the first color data R1, G1, B1, and the minimum value α and the maximum value β output from the maximum and minimum calculator 15. Each of the hue data is generated in the same way as in Embodiment 6, i.e., in accordance with:

r=R1−α,
g=G1−α,
b=B1−α,
y=β−B1,
m=β−G1,
c=β−R1.

The zero remover 20 outputs two of the hue data r, g, b which are not zero, as Q1, Q2, and outputs two of the hue data y, m, c which are not zero, as P1, P2. The relationship between the value of the identification code S1, and P1, P2, Q1, Q2, and the hue data which are zero, is shown in the above Table 2. The minimum value selector 21a outputs the smaller one of Q1, Q2, as the polynomial data T4, while the minimum value selector 21b outputs the smaller one of P1, P2, as the polynomial data T2.

The polynomial data T2, T4 and the identification code S1 which are thus generated are supplied to the color data multiplication coefficient calculator 4b as shown in FIG. 29. The color data multiplication coefficient calculator 4c outputs a color data multiplication coefficient k based on the polynomial data T2, T4, and the identification code S1, by the same operation as in Embodiment 6. The coefficient multiplier 5 multiplies the second color data R2, G2, B2 with the color data multiplication coefficient k, to produce the third color data R3, G3, B3.

As has been described, by providing the polynomial data generator 30 in the color data compressor 3h, and generating the polynomial data T4, T2, and the identification code S1, it is possible to achieve color gamut compression corresponding to the hue of the first color data, as in Embodiment 6, even when the color converter 1 is of a configuration other than that shown in FIG. 18.

Embodiment 9.

Figure 31:
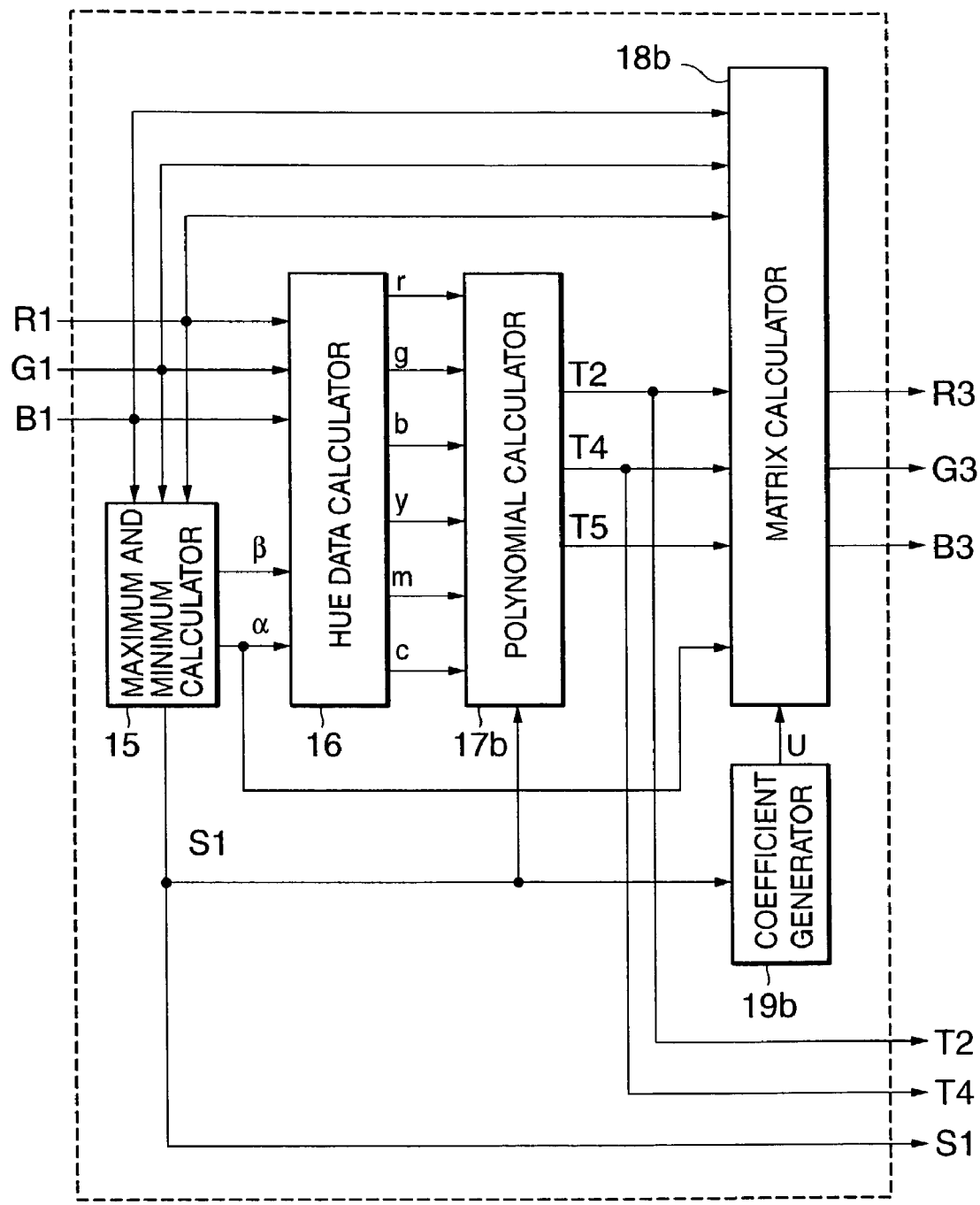
FIG. 31 is a block diagram showing the configuration of the color converter according to Embodiment 9.

FIG. 31 shows the configuration of a color converter 1b according to Embodiment 6. A polynomial calculator 17b generates the polynomial data T2, T4 by the same operation as in Embodiment 6, and additionally generates polynomial data T5 based on the polynomial data T2, T4. A matrix calculator 18b performs matrix calculation on the polynomial data T2, T4, T5 generated by the polynomial calculator 17b, and the minimum value α output from the maximum and minimum calculator 15, in accordance with the following formula (21), to thereby color-convert the first color data R1, G1, B1 to produce the second color data R2, G2, B2.

$$\begin{bmatrix} R2 \\ G2 \\ B2 \end{bmatrix} = \begin{bmatrix} R1 \\ G1 \\ B1 \end{bmatrix} + (Fij) \begin{bmatrix} T2 \\ T4 \\ T5 \\ \alpha \end{bmatrix} \quad (21)$$

Figure 32:
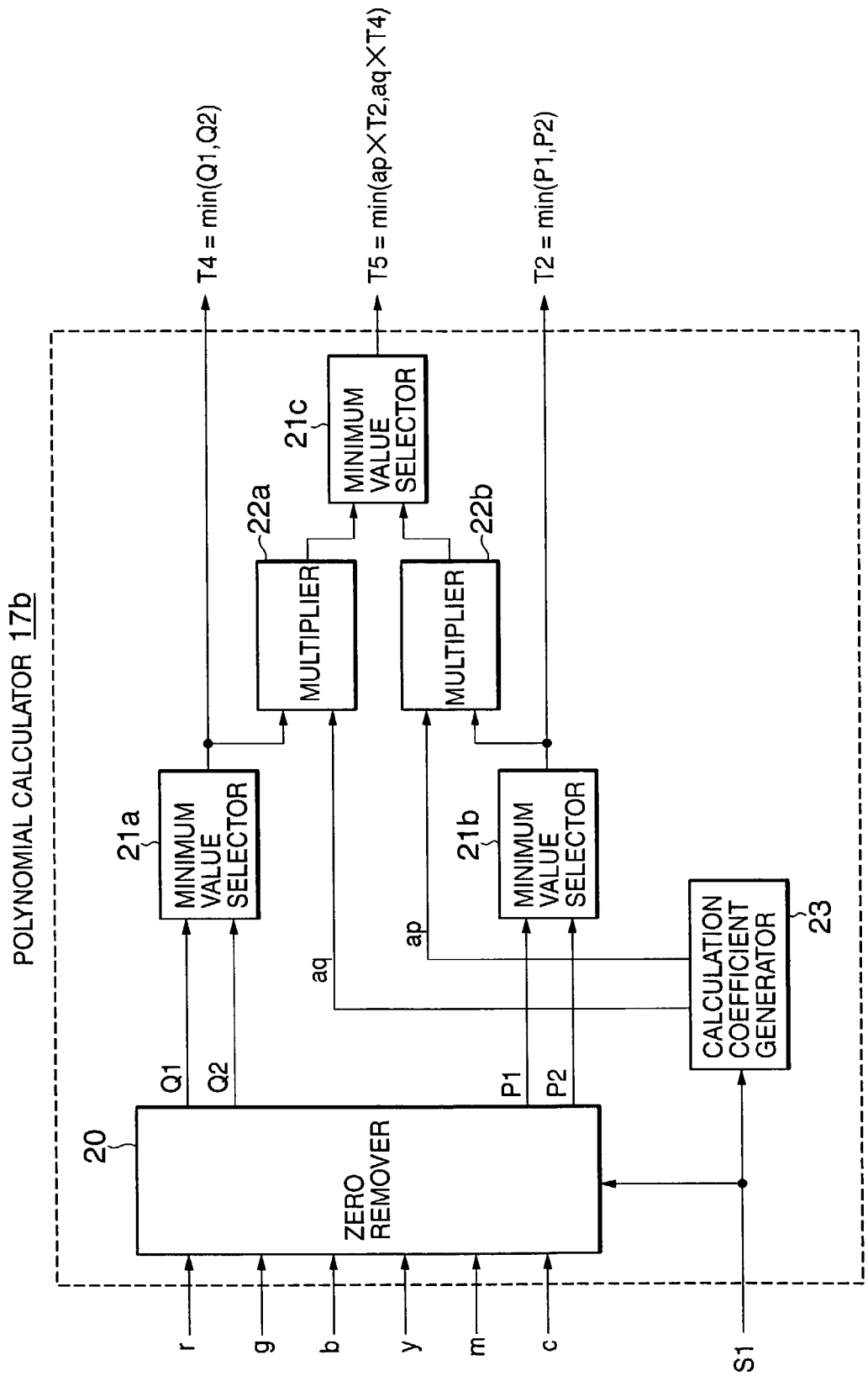
FIG. 32 is a block diagram showing the configuration of the polynomial calculator.

FIG. 32 is a block diagram showing the configuration of the polynomial calculator 17b. A zero remover 20, and minimum value selectors 21a, 21b operate in the same way as in Embodiment 6, to generate the polynomial data T4, T2. A calculation coefficient generator 23 outputs calculation coefficients aqn, qpn (n=0 to 5) selected based on the identification code S1, to multipliers 22a, 22b. Here, the calculation coefficient generator 23 outputs one of six sets of values, ap0 and aq0, ap1 and aq1, ap2 and aq2, ap3 and aq3, ap4 and aq4, or ap5 and aq5, for the calculation coefficients apn, and apn, corresponding to the value of the identification code S1.

The multipliers 22a, 22b multiply the polynomial data T4, T2 with the calculation coefficients aqn, apn, and output the resultant products, apn×T2, aqn×T4 to a minimum value selector 21c. The minimum value selector 21c outputs the smaller one of apn×T2, aqn×T4, as the polynomial data T5. A general representation of the polynomial data T5 is therefore:

T5=min (apn×T2, aqn×T4).

The polynomial data T5 generated in the above manner forms a calculation term which is effective for one of the inter-hue zones, magenta to red, red to yellow, yellow to green, green to cyan, cyan to blue, or blue to magenta. If the calculation terms formed of the polynomial data T5 which are respectively effective for the hues magenta to red, red to yellow, yellow to green, green to cyan, cyan to blue, and blue to magenta, are respectively denoted by h2mr, h2ry, h2yg, h2gc, h2cb, h2bm, the calculation terms are represented by the following equations (22).

For T5

$h2ry$=min ($ap1×h1y, aq1×h1r$)

$h2yg$=min ($ap2×h1y, aq2×h1g$)

$h2gc$=min ($ap3×h1c, aq3×h1g$)

$h2cb=\min(ap4 \times h1c, aq4 \times h1b)$ $h2bm=\min(ap5 \times h1m, aq5 \times h1b)$ $h2mr=\min(ap0 \times h1m, aq0 \times h1r)$ (22)

Table 7 shows the relationship between the identification code S1, and the calculation term which is effective among those formed of the polynomial data T5.

TABLE 7

| ID CODE S1 | INTER-HUE ZONE | T5 |
|---|---|---|
| 0 | MAGENTA-RED | h2mr |
| 1 | RED-YELLOW | h2ry |
| 2 | GREEN-CYAN | h2gc |
| 3 | YELLOW-GREEN | h2yg |
| 4 | CYAN-BLUE | h2cb |
| 5 | BLUE-MAGENTA | h2bm |

As shown in Table 7, when the identification code S1=1, i.e., the color represented by the first color data R1, G1, B1 belongs to the inter-hue zone red to yellow, the calculation terms other than h2ry are all zero, and h2ry is the only effective calculation term.

Figure 33:
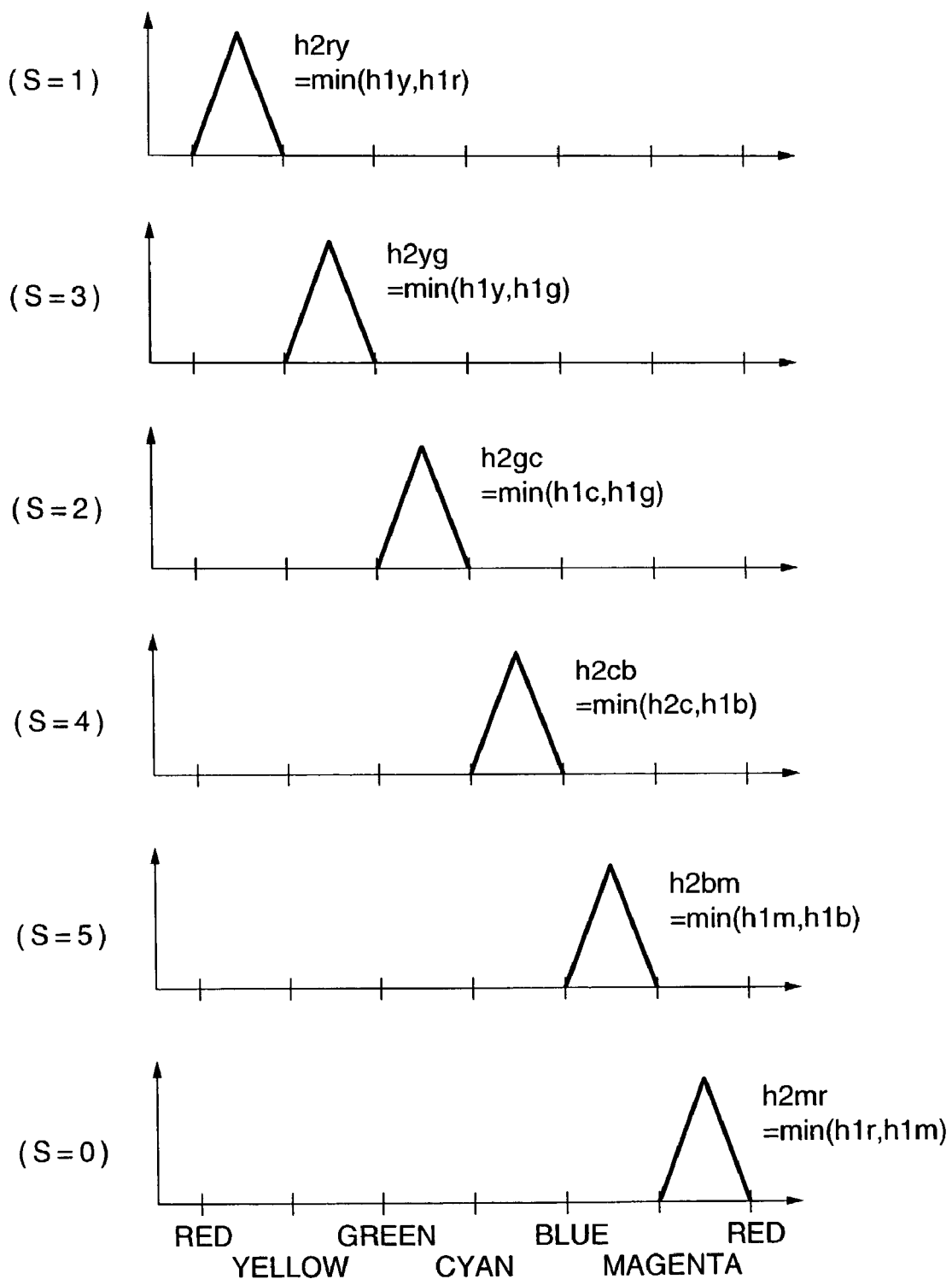
FIG. 33 schematically illustrates polynomial data.

FIG. 33 schematically illustrates the relationship between the respective calculation terms h2mr, h2ry, h2yg, h2gc, h2cb, h2bm formed of the polynomial data T5, and the respective hues red, green, blue, yellow, magenta, cyan, for the case when the calculation coefficients are equal (apn=aqn). As shown in FIG. 33, each of the calculation terms h2mr, h2ry, h2yg, h2gc, h2cb, h2bm formed of the polynomial data T5 is effective for the hue in the middle of the inter-hue zone magenta to red, red to yellow, yellow to green, green to cyan, cyan to blue, or blue to magenta.

Figure 34:
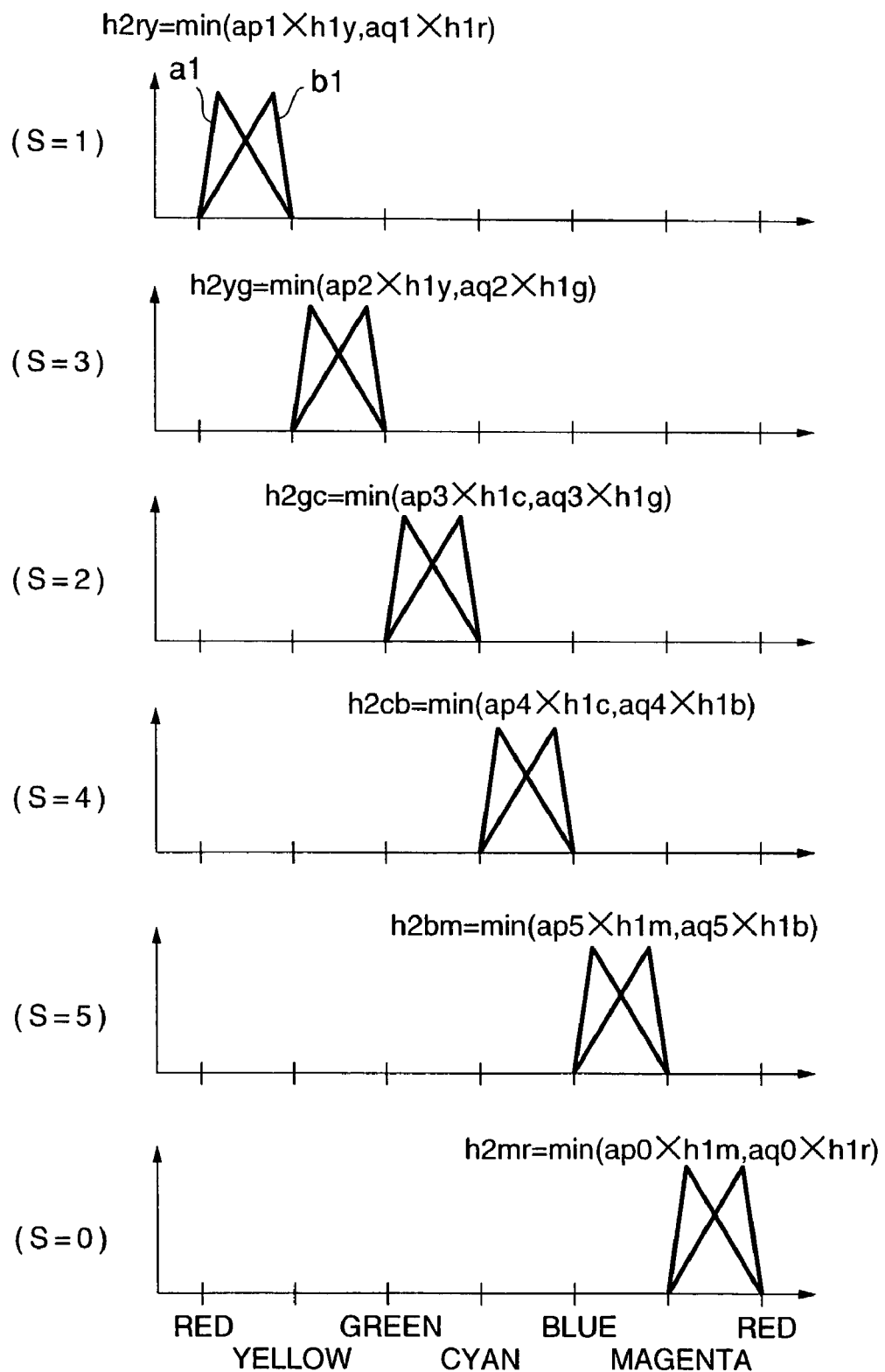
FIG. 34 schematically illustrates polynomial data.

FIG. 34 schematically illustrates the respective calculation terms formed of the polynomial data T5 for the case where aqn:apn=1:2, and for the case where aqn:apn=2:1. As shown in FIG. 34, by varying the values of aqn, apn, the region within each of the inter-hue zones, magenta to red, red to yellow, yellow to green, green to cyan, cyan to blue, and blue to magenta, for which the calculation terms h2mr, h2ry, h2yg, h2gc, h2bm are effective can be controlled. For instance, when aq1:ap1=2:1, the peak of the calculation term h2ry is shifted toward red as indicated by a1, and the calculation term will be effective for a region closer to red, in the inter-hue zone red to yellow. On the other hand, when aq1:ap1=1:2, the peak of the calculation term h2ry is shifted toward yellow as indicated by b1, and the calculation term will be effective for a region closer to red, in the inter-hue zone red to yellow.

The polynomial data T2, T4, T5 generated by the operation described above, as well as the first color data R1, G1, B1, and the minimum value α are input to the matrix calculator 18b. The coefficient generator 19b generates coefficients U corresponding to the matrix coefficients Fij (i=1 to 4, j=1 to 3) for the polynomial data T2, T4, T5, based on the identification code S1. The matrix calculator 18b performs matrix calculation in accordance with the above formula (21) using the first color data R1, G1, B1, the polynomial data T2, T4, T5, the minimum value α, and the matrix coefficients Fij (U) output from the coefficient generator 19a, to produce the second color data R2, G2, B2.

Figure 35:
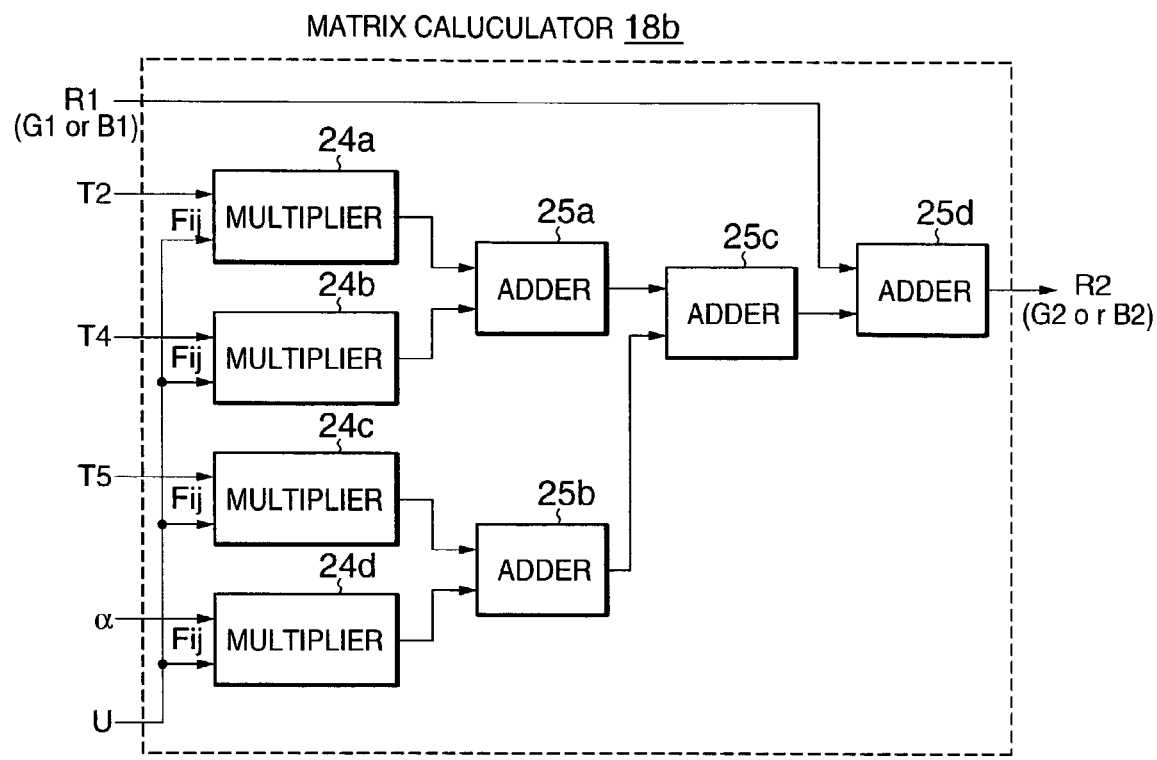
FIG. 35 is a block diagram showing the configuration of the matrix calculator.
Figure 36:
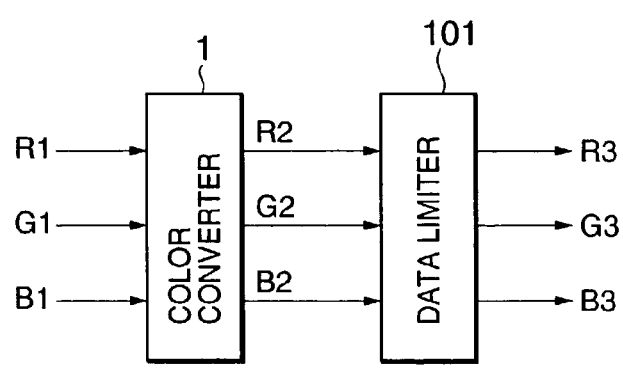
FIG. 36 is a block diagram showing the configuration of a conventional color conversion apparatus.

FIG. 35 is a block diagram showing the configuration of the matrix calculator 18b. Multipliers 24a to 24d multiply the polynomial data T2, T4, T5 and the minimum value α, with the corresponding matrix coefficients Fij. An adder 25a adds the outputs of the multipliers 24a, 24b, an adder 25b adds the outputs of the multipliers 24c, 24d. An adder 25c adds the outputs of the adders 25a and 25b. An adder 25d adds the output of the adder 25c to the first color data R1, and outputs the sum as the second color data R2. If in FIG. 35, the first color data G1 or B1 is input in place of R1, to the adder 25d, the second color data G2 or B2 is calculated.

If the polynomial data T4, T2 is substituted by h1r, h1g, h1b, h1y, h1c, h1m, and the polynomial data T5 is substituted by h2mr, h2ry, h2yg, h2gc, h2cb, h2bm, the formula (23) can be rewritten as follows: Here, for Fij, i=1 to 13, j=1 to 3.

$$\begin{bmatrix} R2 \\ G2 \\ B2 \end{bmatrix} = \begin{bmatrix} R1 \\ G1 \\ B1 \end{bmatrix} + (Fij) \begin{bmatrix} h1r \\ h1g \\ h1b \\ h1c \\ h1m \\ h1y \\ h2ry \\ h2rm \\ h2gy \\ h2gc \\ h2bm \\ h2bc \\ \alpha \end{bmatrix} \quad (23)$$

As shown in the formulae (22) and (23), the color converter 1b according to the present embodiment performs color conversion by matrix calculation using, as calculation terms, the polynomial data T2, T4 each of which is effective for one of the hues of red, yellow, green, cyan, blue, and magenta, and the polynomial data T5 which relates to one of the inter-hue zones between adjacent ones of the six hues, so that hue components in the inter-hue zones as well as the hue components of the six hues can be independently controlled.

What is claimed is:

1. A color conversion apparatus comprising:
a second-color-data generating unit for converting a hue, lightness, and/or saturation of first color data representing respective colors forming a color image to generate second color data corresponding to the first color data; and
a third-color-data generating unit for generating third color data suitable for the color space which can be expressed by an image output unit used for outputting the color image, wherein said third-color-data generating unit generates the third color data based on a maximum value of the gradation levels of the respective colors represented by the second color data.

2. The color conversion apparatus as set forth in claim 1, wherein said third color data generating unit reduces the gradation level of each of the colors of the second color data according to the maximum value in excess of a predetermined value.

3. The color conversion apparatus as set forth in claim 1, further comprising
a complementary-color-data outputting unit for outputting complementary color data representing the respective complementary colors of a plurality of colors represented by the second color data,
wherein said third-color-data generating unit generates the third color data based on the complementary color data.

4. The color conversion apparatus as set forth in claim 2, wherein said third-color-data generating unit generates the third color data based on a maximum value of the gradation levels of the respective complementary colors represented by the complementary color data.

5. The color conversion apparatus as set forth in claim 4, wherein said third-color-data generating unit generates the third color data by reducing the gradation level of each of the complementary colors of the complementary color data according to the maximum value in excess of a predetermined value.

6. The color conversion apparatus as set forth in claim 1, further comprising
a ratio calculating unit for calculating a ratio between the hue components of magenta and red, red and yellow, yellow and green, green and cyan, cyan and blue, or blue and magenta,
said third-color-data generating unit generates the third color data based on the ratio between the hue components.

7. A color conversion apparatus comprising:
a first-calculation-term generating unit responsive to first color data representing respective colors of red, green and blue, for generating a first calculation term which is effective for at least one of the hues of red, green, blue, cyan, magenta and yellow;
a second-color-data generating unit for generating second color data corresponding to the first color data; and
a third-color-data generating unit responsive to the first calculation term, and the second color data, for generating third color data suitable for the color space expressed by the image output unit used for outputting the color image, wherein said third-color-data generating unit generates the third color data based on a maximum value of the gradation levels of the respective colors represented by the second color data.

8. The color conversion apparatus as set forth in claim 7, wherein said third color data generating unit reduces the gradation level of each of the colors of the second color data according to the maximum value in excess of a predetermined value.

9. The color conversion apparatus as set forth in claim 7, further comprising
a second-calculation-term generating unit for generating a second calculation term effective for a predetermined hue included in one of inter-hue zones of red to yellow, yellow to green, green to cyan, cyan to blue, blue to magenta, and magenta to red, based on the first calculation term;
wherein said second-color-data generating unit generates the second color data also by multiplying the second calculation term by a predetermined matrix coefficient;
the third-color-data generating unit generates the third color data based also on the second color data.

10. A color conversion method comprising the steps of:
converting a hue, lightness, and/or saturation of first color data representing the respective colors forming a color image to generate second color data corresponding to the first color data; and
generating, based on the second color data, third color data suitable for the color space which can be expressed by an image output unit used for outputting the color image, wherein said step of generating the third color data generates the third color data based on a maximum value of the gradation levels of the respective colors represented by the second color data.

11. The color conversion method as set forth in claim 10, wherein said step of generating the third color data generates the third color data by reducing the gradation level of each of the colors of the second color data according to the maximum value in excess of a predetermined value.

12. The color conversion method as set forth in claim 10, wherein said step of generating the third color data generates the third color data based on the complementary color data representing the respective complementary colors of a plurality of colors represented by the second color data.

13. The color conversion method as set forth in claim 12, wherein said step of generating the third color data generates the third color data based on a maximum value of the gradation levels of the respective complementary colors represented by the complementary color data.

14. The color conversion method as set forth in claim 13, wherein said step of generating the third color data generates the third color data by reducing the gradation level of each of the complementary colors of the complementary color data according to the maximum value in excess of a predetermined value.

15. The color conversion method as set forth in claim 10, further comprising the step of:
calculating a ratio between the hue components of magenta and red, red and yellow, yellow and green, green and cyan, cyan and blue, or blue and magenta,
wherein said step of generating the third color data generates the third color data based on the ratio between the hue components.

* * * * *